(12) United States Patent
Oh et al.

(10) Patent No.: US 12,200,767 B2
(45) Date of Patent: Jan. 14, 2025

(54) METHOD AND APPARATUS FOR DETERMINING UPLINK TRANSMISSION RESOURCES IN WIRELESS COMMUNICATION SYSTEM

(71) Applicant: Samsung Electronics Co., Ltd., Gyeonggi-do (KR)

(72) Inventors: Jinyoung Oh, Gyeonggi-do (KR); Hyunseok Ryu, Gyeonggi-do (KR); Jonghyun Bang, Gyeonggi-do (KR); Cheolkyu Shin, Gyeonggi-do (KR); Jeongho Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 277 days.

(21) Appl. No.: 17/634,085

(22) PCT Filed: Aug. 5, 2020

(86) PCT No.: PCT/KR2020/010289
§ 371 (c)(1),
(2) Date: Feb. 9, 2022

(87) PCT Pub. No.: WO2021/029591
PCT Pub. Date: Feb. 18, 2021

(65) Prior Publication Data
US 2022/0369372 A1    Nov. 17, 2022

(30) Foreign Application Priority Data

Aug. 9, 2019   (KR) .......................... 10-2019-0097513

(51) Int. Cl.
*H04W 74/0816*   (2024.01)
*H04L 27/26*   (2006.01)
(Continued)

(52) U.S. Cl.
CPC ...... *H04W 74/0816* (2013.01); *H04L 27/2605* (2013.01); *H04W 72/1268* (2013.01); *H04W 74/0866* (2013.01)

(58) Field of Classification Search
CPC ......... H04W 74/0816; H04W 72/1268; H04W 74/0866
See application file for complete search history.

(56) References Cited

U.S. PATENT DOCUMENTS

2018/0270860 A1    9/2018   Bhorkar et al.
2021/0400719 A1   12/2021   Oh et al.
2022/0039158 A1*   2/2022   Awadin ............. H04W 74/0866

FOREIGN PATENT DOCUMENTS

KR    10-2020-0050849           5/2020

OTHER PUBLICATIONS

PCT/ISA/210 Search Report issued on PCT/KR2020/010289, Nov. 20, 2020, pp. 5.

(Continued)

*Primary Examiner* — James P Duffy
(74) *Attorney, Agent, or Firm* — The Farrell Law Firm, P.C.

(57) ABSTRACT

Provided is an operating method of a terminal, the method including receiving configuration information of channel occupancy from a base station, receiving a downlink control channel from the base station based on the configuration information, determining whether to transmit an uplink control channel or an uplink data channel to the base station based on the downlink control channel, if determining whether to transmit the uplink control channel or the uplink data channel to the base station, determining valid resources and transmission power for transmission of the uplink control channel or the uplink data channel, and transmitting the uplink control channel or the uplink data channel to the (Continued)

base station based on determining the valid resources and the transmission power is provided.

20 Claims, 16 Drawing Sheets

(51) Int. Cl.
*H04W 72/1268* (2023.01)
*H04W 74/08* (2024.01)

(56) References Cited

OTHER PUBLICATIONS

PCT/ISA/237 Written Opinion issued on PCT/KR2020/010289, Nov. 20, 2020, pp. 8.
Nokia, Nokia Shanghai Bell, 3GPP TSG RAN WG1 Meeting #97, R1-1906657, Reno, Nevada, USA, May 13-17, 2019, "On Wideband operation in NR-U", pp. 15.
Nokia, Nokia Shanghai Bell, 3GPP TSG RAN WG1 Meeting #97, R1-1906645, Reno, US, May 13-17, 2019, "On support of UL transmission with configured grants in NR-U", pp. 11.
Huawei, HiSilicon, 3GPP TSG RAN WG1 Meeting #97, R1-1906048, Reno, USA, May 13-17, 2019, "NRU wideband BWP operation", pp. 9.
ZTE, Sanechips, 3GPP TSG RAN WG1 Meeting #97, R1-1905955, Reno, USA, May 13-17, 2019, "Discussions on Wide-band operation for NR-U", pp. 6.

\* cited by examiner

METHOD AND APPARATUS FOR DETERMINING UPLINK TRANSMISSION RESOURCES IN WIRELESS COMMUNICATION SYSTEM

PRIORITY

This application is a National Phase Entry of International Application No. PCT/KR2020/010289, which was filed on Aug. 5, 2020, and claims priority to Korean Patent Applications No. 10-2019-0097513, filed in the Korean Intellectual Property Office on Aug. 9, 2019, the entire content of each of which is incorporated herein by reference.

TECHNICAL FIELD

The present disclosure generally relates to a wireless communication system, and more particularly, a method and an apparatus for a terminal to determine resources for transmitting an uplink signal or channel and control power therefor in the wireless communication system.

BACKGROUND ART

To satisfy a wireless data traffic demand which is growing after a $4^{th}$ generation (4G) communication system is commercialized, efforts are exerted to develop an advanced $5^{th}$ generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (COMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

DISCLOSURE OF INVENTION

Technical Problem

Based on the discussions described above, the present disclosure provides a method and an apparatus for determining resources for transmitting an uplink signal or channel and controlling power therefor in a wireless communication system.

Solution to Problem

According to various embodiments of the present disclosure, an operating method of a terminal in a wireless communication system is provided. The method includes receiving configuration information of channel occupancy from a base station, receiving a downlink control channel from the base station based on the configuration information, determining whether to transmit an uplink control channel or an uplink data channel to the base station based on the downlink control channel, if determining whether to transmit the uplink control channel or the uplink data channel to the base station, determining valid resources and transmission power for transmission of the uplink control channel or the uplink data channel, and transmitting the uplink control channel or the uplink data channel to the base station based on determining the valid resources and the transmission power.

According to various embodiments of the present disclosure, an operating method of a base station in a wireless communication system is provided. The method includes performing configuration related to a subband, occupying a channel through an idle subband based on the configuration, transmitting configuration information of the channel occupancy to a terminal, transmitting a downlink control channel based on the configuration information, and receiving an uplink control channel or an uplink data channel from the terminal based on the downlink control channel.

According to various embodiments of the present disclosure, an apparatus of a terminal in a wireless communication system is provided. The apparatus includes a transceiver and at least one processor, and the at least one processor is configured to receive configuration information of channel occupancy from a base station, receive a downlink control channel from the base station based on the configuration information, determine whether to transmit an uplink control channel or an uplink data channel to the base station based on the downlink control channel, if determining whether to transmit the uplink control channel or the uplink data channel to the base station, determine valid resources and transmission power for transmission of the uplink control channel or the uplink data channel, and transmit the uplink control channel or the uplink data channel to the base station based on determining the valid resources and the transmission power.

According to various embodiments of the present disclosure, an apparatus of a base station in a wireless communication system is provided. The apparatus includes a transceiver and at least one processor, and the at least one processor is configured to perform configuration related to a subband, occupying a channel through an idle subband based on the configuration, transmit configuration information of the channel occupancy to a terminal, transmit a downlink control channel based on the configuration information, and receive an uplink control channel or an uplink data channel from the terminal based on the downlink control channel.

Advantageous Effects of Invention

Various embodiments of the present disclosure may provide a method and an apparatus for determining resources for transmitting an uplink signal or channel and controlling power therefor in a wireless communication system.

Effects obtainable from the present disclosure are not limited to the above-mentioned effects, and other effects which are not mentioned may be clearly understood by those skilled in the art of the present disclosure through the following descriptions.

BEST MODE FOR CARRYING OUT THE INVENTION

Figure 1:
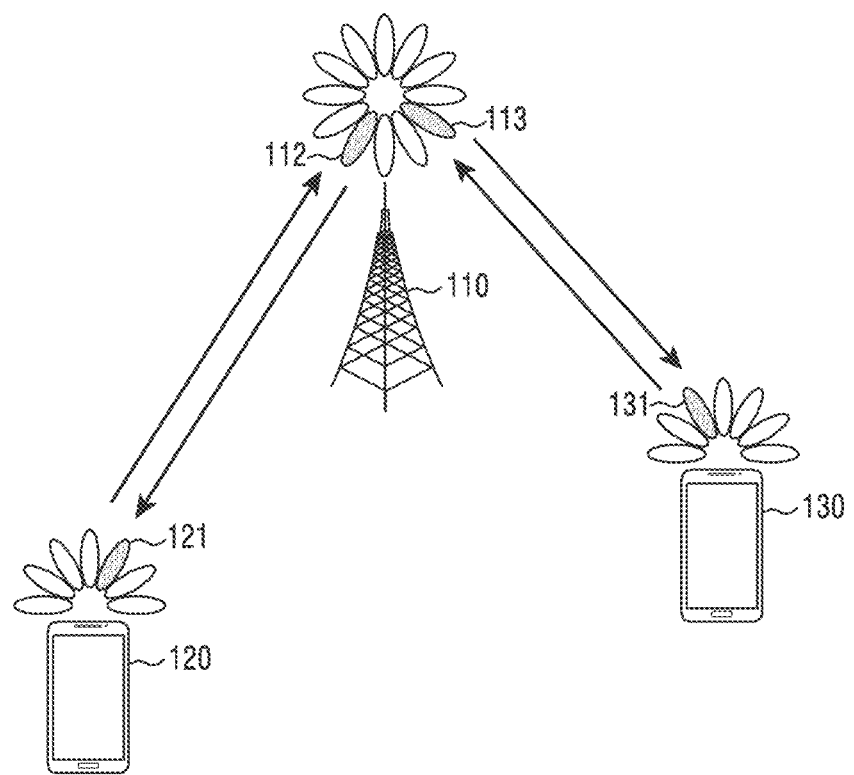
FIG. 1 illustrates a wireless communication system according to various embodiments of the present disclosure.

Hereafter, embodiments of the present disclosure will be described in detail with reference to the accompanying drawings. Also, if it is determined that a detailed description of a related known function or configuration may unnecessarily obscure the subject matter of the present disclosure, the detailed description will be omitted in describing the present disclosure. Terms to be described are terms defined in consideration of the functions of the present disclosure, which may vary according to a user's or operator's intent or practice. Hence, their definition should be made based on contents throughout this specification.

Advantages and features of the present disclosure, and a method for achieving them will be clarified with reference to embodiments described below in detail together with the accompanying drawings. However, the present disclosure is not limited to the embodiments disclosed below, but may be implemented in various different forms, the embodiments are provided to only complete the disclosure of the present disclosure and to allow those skilled in the art to which the present disclosure pertains to fully understand a category of the disclosure, and the present disclosure may be defined merely by the category of claims. The same reference numeral may refer to the same element throughout the specification.

Hereafter, embodiments of the present disclosure are described in detail with reference to the accompanying drawings.

In describing the embodiments, technical contents well known in the technical field to which the present disclosure pertains and which are not directly related to the present disclosure are omitted in the descriptions. This is to provide the subject matter of the present disclosure more clearly by omitting unnecessary descriptions without obscuring the subject matter of the present disclosure.

For the same reason, some components in the accompanying drawings are exaggerated, omitted, or schematically illustrated. Also, a size of each component does not entirely reflect its actual size. The same reference number is given to the same or corresponding element in each drawing.

Advantages and features of the present disclosure, and a method for achieving them will be clarified with reference to embodiments described below in detail together with the accompanying drawings. However, the present disclosure is not limited to the embodiments disclosed below, but may be implemented in various different forms, the embodiments are provided to only complete the disclosure of the present disclosure and to allow those skilled in the art to which the present disclosure pertains to fully understand a category of the disclosure, and the present disclosure may be defined merely by the category of claims. The same reference numeral may refer to the same element throughout the specification.

In so doing, it will be understood that each block of the flowchart illustrations and combinations of the flowchart illustrations may be executed by computer program instructions. These computer program instructions may be mounted on a processor of a general-purpose computer, a special-purpose computer or other programmable data processing equipment, and accordingly instructions performed through the processor of the computer or other programmable data processing equipment create means for performing functions described in the flowchart block(s). Since these computer program instructions may be stored in a computer usable or computer readable memory which may aim for the computer or the other programmable data processing equipment to implement the function in a particular manner, the instructions stored in the computer usable or computer readable memory may produce a manufacture article including instruction means which conducts the function described in the flowchart block(s). Since the computer program instructions may also be mounted on the computer or the other programmable data processing equipment, a series of operational steps may be performed on the computer or the other programmable data processing equipment to generate a computer-executed process and the instructions performing the computer or the other programmable data processing equipment may provide steps for executing the functions described in the flowchart block(s).

Also, each block may represent a module, a segment or a part of code including one or more executable instructions for executing specified logical function(s). It should also be noted that the functions mentioned in the blocks may occur out of sequence in some alternative implementations. For example, two blocks shown in succession may in fact be executed substantially simultaneously or the blocks may be sometimes executed in reverse order according to a corresponding function.

At this time, the term '~ unit' used in the present embodiment indicates software or a hardware component such as a field programmable gate array (FPGA) or an application specific integrated circuit (ASIC), and '~ unit' may perform specific tasks. However, '~ unit' is not limited to the software or the hardware. '~ unit' may be configured to be in an addressable storage medium or may be configured to reproduce one or more processors. Thus, as an example, '~ unit' may include components such as software components, object-oriented software components, class components and task components, processes, functions, attributes, procedures, sub-routines, segments of program code, drivers, firmware, microcode, circuitry, data, databases, data structures, tables, arrays, and variables. Functionalities provided in the components and '~ units' may be combined into fewer components and '~ units' or may be further divided into additional components and '~ units'. Besides, the components and '~ units' may be implemented to reproduce one or more central processing units (CPUs) within a device or a security multimedia card. In addition, '~ unit' may include one or more processors in an embodiment.

A wireless communication system is developing into, for example, a broadband wireless communication system which provides high-speed and high-quality packet data service with communication standards such as high speed packet access (HSPA) of 3rd-generation partnership project (3GPP), LTE or evolved universal terrestrial radio access (E-UTRA), LTE-A, high rate packet data (HRPD) of 3rd generation partnership project 2 (3GPP2), ultra-mobile broadband (UMB), and 802.16e of Institute of Electrical and Electronics Engineers (IEEE), beyond initial voice-based service provision. Also, communication standards of 5G or new radio (NR) are being developed as the 5G wireless communication system.

The 5G communication system may adopt various techniques such as a technique (e.g., grant-free uplink transmission) for transmitting an uplink signal without code block group (CBG) based retransmission, and uplink scheduling information to provide various services and to support a high data rate. At least one service of enhanced mobile broadband (eMBB), massive machine type communications (mMTC) and ultra-reliable and low-latency communications (URLLC) may be provided to a terminal in a wireless communication system including the 5G. The above-stated services may be provided to the same terminal during the same time interval. In an embodiment, the eMBB may be a service aiming at a high-speed transmission of high-capacity data, the mMTC may be a service aiming at terminal power minimization and multi-terminal connections, and the URLLC may be a service aiming at high reliability and low latency, which are not thereto. The three services may be major scenarios in the LTE system or the post-LTE system such as 5G/new radio, next radio (NR), but are not limited to the above examples. In addition, the services of the 5G system are exemplary, and available services of the 5G system are not limited to the above examples. Th system providing the URLLC service may be referred to as a URLLC system, and the system providing the eMBB service may be referred to as an eMBB system. In addition, the terms service and system may be used interchangeably or mixed.

Hereafter, the base station is an entity which performs resource allocation for the terminal, and may include at least one of an eNode B, a Node B, a base station (BS), a radio access unit, a base station controller, or a node on a network. The terminal may include at least one of a user equipment (UE), a mobile station (MS), a cellular phone, a smart phone, a computer, or a multimedia system for performing a communication function. In the present disclosure, a downlink (DL) may indicate a radio transmission path of a signal transmitted by the base station to the terminal, and an uplink (UL) may indicate a radio transmission path of a signal transmitted by the terminal to the base station. In addition, an embodiment of the present disclosure is now described with an example of the LTE or LTE-A system, and terms of a physical channel and a signal of the conventional LTE or LTE-A system may be used to describe the method and the apparatus suggested in the present disclosure. The embodiment of the present disclosure may be applied to other communication systems having similar technical background or channel type to a mobile communication system described in the present disclosure. For example, the 5G mobile communication technology (5G, NR) developed after the LTE-A may be included. In addition, the embodiment of the present disclosure may be applied to other communication system through some modifications within a range not significantly departing from the scope of the present disclosure as determined by a person having skilled technical knowledge.

As a representative example of the broadband wireless communication system, the 5G system or the NR system adopts an orthogonal frequency division multiplexing (OFDM) scheme in the DL, and adopts both the OFDM and a single carrier frequency division multiple access (SC-FDMA) or discrete Fourier transform (DFT) spread OFDM (DFT-s-OFDM) scheme in the UL. The multiple access scheme may distinguish data or control information of each user, by allocating and operating them, not to overlap time-frequency resources carrying the data or the control information of each user, that is, to establish orthogonality.

The NR system adopts a hybrid automatic repeat request (HARQ) scheme which retransmits corresponding data in a physical layer, if decoding failure occurs in an initial transmission. If a receiver may not correctly decode the data, the HARQ scheme may allow the receiver to transmit information informing of the decoding failure (e.g., negative acknowledgment (NACK)) to a transmitter, and the transmitter to retransmit the corresponding data in the physical layer. The receiver may improve data reception performance by combining the data retransmitted by the transmitter with the data previously failed in decoding. In addition, if the receiver correctly decodes the data, the HARQ scheme may allow the receiver to transmit information informing of decoding success (e.g., ACK) to the transmitter and the transmitter to transmit new data.

Terms indicating signals, terms indicating channels, terms indicating control information, terms indicating network entities, and terms indicating components of a device used in the following descriptions are illustrated only for convenience of description. Accordingly, the present disclosure is not limited to the terms to be described, and other terms having the same technical meaning may be used.

In addition, the present disclosure describes various embodiments using terms used in some communication standards (e.g., 3GPP), which are merely exemplary for explanations. Various embodiments of the present disclosure may be easily modified and applied in other communication systems.

Various embodiments of the present disclosure are described based on the NR system, but the content of the present disclosure is not limited to the NR system and may be applied to various wireless communication systems such as LTE, LTE-A, LTE-A-Pro, and 5G. In addition, the content of the present disclosure describes a system and an apparatus for transmitting and receiving a signal using an unlicensed band, but the content of the present disclosure may also be applicable to a system which operates in a licensed band.

Hereafter, in the present disclosure, higher layer signaling or a higher signal may be a signal transmission method from the base station to the terminal using a DL data channel of the physical layer, or from the terminal to the base station using a UL data channel of the physical layer, and may include at least one of signal transmission methods transmitted through radio resource control (RRC) signaling, packet data convergence protocol (PDCP) signaling, or a media access control (MAC) control element (CE). In addition, the higher layer signaling or the higher signal may include system information commonly transmitted to a plurality of terminals, for example, system information block (SIB), and may also include information excluding master information block (MIB) in information transmitted over a physical broadcast channel (PBCH). At this time, the MIB may be also included in the higher signal.

An apparatus and a method according to various embodiments of the present disclosure may provide a method for a terminal to determine resources for transmitting uplink control information and to control transmission power therefor, to thus allow the base station and the terminal to perform communication more validly.

Effects obtainable from the present disclosure are not limited to the above-mentioned effects, and other effects which are not mentioned may be clearly understood by those skilled in the art of the present disclosure through the following descriptions.

FIG. 1 illustrates a wireless communication system according to various embodiments of the present disclosure. FIG. 1 may depict a base station 110, a terminal 120, and a terminal 130, as some of nodes which use a radio channel in the wireless communication system. While FIG. 1 depicts only one base station, other base station which is identical to or similar to the base station 110 may be further included.

The base station 110 may be a network infrastructure for providing radio access to the terminals 120 and 130. The base station 110 has coverage defined as a specific geographical area based on a signal transmission distance. The base station 110 may be referred to as, besides the base station, an access point (AP), an eNodeB (eNB), a gNodeB (gNB), a 5G node, a wireless point, a transmission/reception point (TRP), or other terms having the technically identical meaning.

The terminal 120 and the terminal 130 each are a device used by a user, and may communicate with the base station 110 over a radio channel. In some cases, at least one of the terminal 120 and the terminal 130 may operate without user's involvement. That is, at least one of the terminal 120 and the terminal 130 is a device which performs machine type communication (MTC), and may not be carried by the user. The terminal 120 and the terminal 130 each may be referred to as, besides the terminal, a user equipment (UE), a mobile station, a subscriber station, a remote terminal, a wireless terminal, a user device, or other term having the equivalent technical meaning.

A wireless communication environment may include wireless communication in an unlicensed band. The base station 110, the terminal 120, and the terminal 130 may transmit and receive radio signals in the unlicensed band (e.g., 5 through 7 GHz, 64 through 71 GHz). In an embodiment, a cellular communication system and another communication system (e.g., a wireless local area network (WLAN)) may coexist in the unlicensed band. To guarantee fairness between the two communication systems, that is, not to cause one system to exclusively use the channel, the base station 110, the terminal 120, and the terminal 130 may perform a channel access procedure for the unlicensed band. As an example of the channel access procedure for the unlicensed band, the base station 110, the terminal 120, and the terminal 130 may perform listen before talk (LBT).

The base station 110, the terminal 120, and the terminal 130 may transmit and receive radio signals in a millimeter wave (mmWave) band (e.g., 28 GHz, 30 GHz, 38 GHz, 60 GHz). In so doing, to improve channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a received signal. For doing so, the base station 110 and the terminals 120 and 130 may select serving beams through a beam search or beam management procedure. After the serving beams are selected, communications may be performed using resources which are quasi co-located (QCL) with resources which carry the serving beams.

Figure 2:
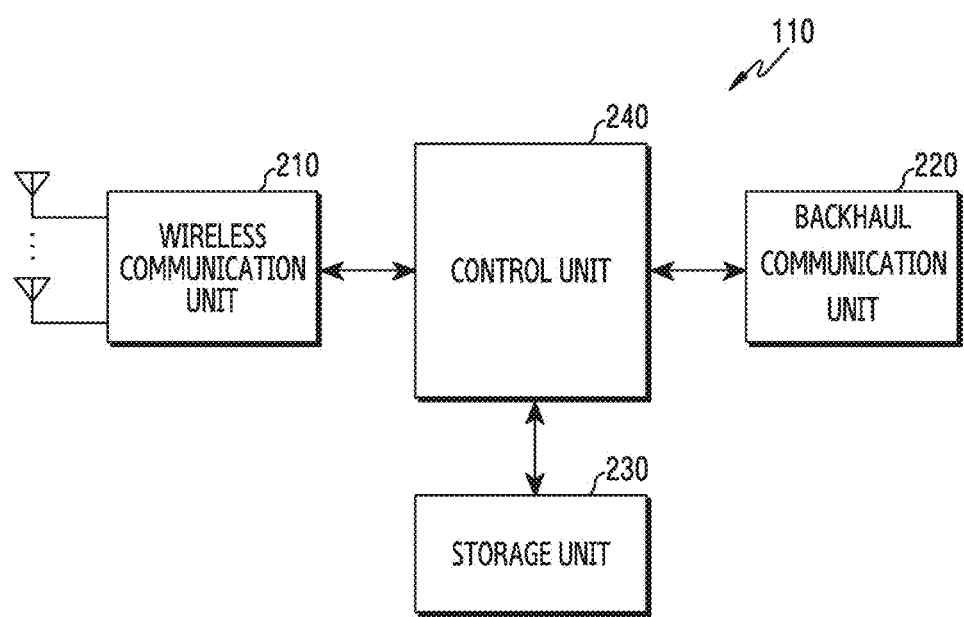
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration in FIG. 2 may be understood as the configuration of the base station 110 of FIG. 1. A term such as 'portion' or '~ er' used hereafter indicates a unit for processing at least one function or operation, and may be implemented using hardware, software, or a combination of hardware and software.

Referring to FIG. 2, the base station may include a wireless communication unit 210, a backhaul communication unit 220, a storage unit 230, and a control unit 240.

The wireless communication unit 210 (which may be used with a transceiving unit) may perform functions for transmitting and receiving a signal over a radio channel. For example, the wireless communication unit 210 performs a conversion function between a baseband signal and a bit string according to a physical layer standard of the system. For example, in data transmission, the wireless communication unit 210 may generate complex symbols by encoding and modulating a transmit bit string. Also, in data reception, the wireless communication unit 210 may restore a receive bit string by demodulating and decoding a baseband signal.

Also, the wireless communication unit 210 may up-convert the baseband signal to a radio frequency (RF) band signal, transmit it via an antenna, and down-convert an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements.

In terms of the hardware, the wireless communication unit 210 may include a digital unit and an analog unit, and the analog unit may include a plurality of sub-units according to an operating power, an operating frequency and the like. The digital unit may be implemented with at least one processor (e.g., a digital signal processor (DSP)).

The wireless communication unit 210 may transmit and receive the signal as stated above. Hence, whole or part of the wireless communication unit 210 may be referred to as 'a transmitter', 'a receiver', or 'a transceiver'. Also, in the following explanations, the transmission and the reception over the radio channel is used as the meaning which embraces the above-stated processing of the wireless communication unit 210. According to an embodiment, the wireless communication unit 210 may at least one transceiver.

The backhaul communication unit 220 may provide an interface for communicating with other nodes in the network. That is, the backhaul communication unit 220 may convert a bit sting transmitted from the base station to other node, for example, other access node, other base station, an upper node, or a core network, to a physical signal, and convert a physical signal received from the other node to a bit string.

The storage unit 230 may store a basic program for operating the base station, an application program, and data such as setting information. The storage unit 230 may include a volatile memory, a non-volatile memory, or a combination of a volatile memory and a non-volatile memory. The storage unit 230 may provide the stored data at a request of the control unit 240. In an embodiment, the storage unit 230 may include a memory.

The control unit 240 may control general operations of the base station. For example, the control unit 240 may transmit and receive the signal through the wireless communication unit 210 or the backhaul communication unit 220. Also, the control unit 240 may record and read data in and from the storage unit 230. The control unit 240 may execute functions of a protocol stack requested by a communication standard. In an embodiment, the protocol stack may be included in the wireless communication unit 210. In an embodiment, the control unit 240 may include at least one processor.

According to various embodiments, the control unit 240 may control the base station to perform operations according to various embodiments to be described. For example, the control unit 240 may perform the channel access procedure for the unlicensed band. For example, the transceiving unit (e.g., the wireless communication unit 210) may receive signals transmitted in the unlicensed band, and the control unit 240 may determine whether the above-described unlicensed band is idle or not by comparing a strength of the received signal with a threshold which is predefined or determined to a function value having the bandwidth as a factor. In addition, for example, the control unit 240 may transmit a control signal to the terminal, or receive a control signal from the terminal through the transceiving unit. In addition, the control unit 240 may transmit data to the terminal or receive data from the terminal through the transceiving unit. The control unit 240 may determine a transmission result of the signal transmitted to the terminal, based on the control signal or the data signal received from the terminal.

In addition, for example, based on the transmission result, that is, based on the reception result of the terminal with respect to the control signal or the data signal, the control unit 240 may maintain or change a contention window value (hereafter, contention window adjustment) for the channel access procedure. According to various embodiments, the control unit 240 may determine a reference slot, to obtain the transmission result for the contention window adjustment. The control unit 240 may determine a data channel for the contention window adjustment in the reference slot. The control unit 240 may determine a reference control channel for the contention window adjustment in the reference slot. If determining that the unlicensed band is idle, the control unit 240 may occupy the channel.

In addition, the control unit 240 may receive uplink control information from the terminal through the wireless communication unit 210 according to the content described in the present disclosure, and control to identify whether to retransmit a downlink data channel, and/or whether to change a modulation and coding scheme through one or more HARQ-ACK information or channel state information (CSI) included in the above-described uplink control information. In addition, the control unit 240 may generate downlink control information which schedules the downlink data initial or retransmission or requests uplink control information transmission, and control to transmit the above-described downlink control information to the terminal through the wireless communication unit 210. In addition, the control unit 240 may control the above-described wireless communication unit 210 to receive the (re) transmitted uplink data and/or uplink control information according to the above-described downlink control information.

Figure 3:
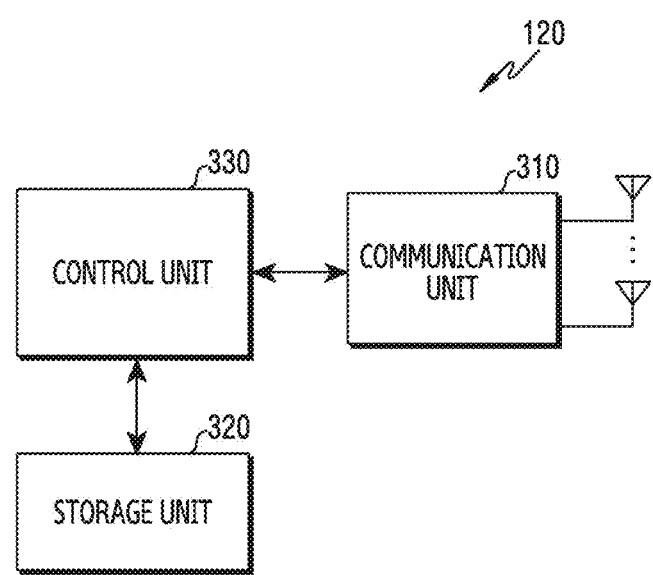
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration illustrated in FIG. 3 may be understood as the configuration of the terminal 110 and 120 of FIG. 1. A term such as 'portion' or '~ er' used hereafter indicates a unit for processing at least one function or operation, and may be implemented using hardware, software, or a combination of hardware and software.

Referring to FIG. 3, the terminal may include a communication unit 310, a storage unit 320, and a control unit 330.

The communication unit 310 may perform functions for transmitting and receiving a signal over the radio channel. For example, the communication unit 310 may perform a conversion function between a baseband signal and a bit string according to the physical layer standard of the system. For example, in data transmission, the communication unit 310 may generate complex symbols by encoding and modulating a transmit bit string. Also, in data reception, the communication unit 310 may restore a receive bit string by demodulating and decoding a baseband signal. Also, the communication unit 310 may up-convert the baseband signal to an RF band signal, transmit it via an antenna, and down-convert an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In terms of the hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 may transmit and receive the signals as stated above. Hence, whole or part of the communication unit 310 may be referred to as 'a transmitter', 'a receiver', or 'a transceiver'. In addition, the transmission and the reception over the radio channel are used as the meaning which embraces the above-stated processing of the communication unit 310 in the following explanations. According to an embodiment, the communication unit 310 may include at least one transceiver.

The storage unit 320 may store a basic program for operating the terminal, an application program, and data such as setting information. The storage unit 320 may include a volatile memory, a non-volatile memory, or a combination of a volatile memory and a non-volatile memory. The storage unit 320 may provide the stored data at a request of the control unit 330. According to an embodiment, the storage unit 320 may include a memory.

The control unit 330 may control general operations of the terminal. For example, the control unit 330 may transmit and receive the signal through the communication unit 310. Also, the control unit 330 records and reads data in and from the storage unit 320. The control unit 330 may execute functions of the protocol stack required by the communication standard. For doing so, the control unit 330 may include at least one processor or microprocessor, or may be part of a processor. According to an embodiment, the control unit 330 may include at least one processor. In addition, according to an embodiment, part of the communication unit 310 and the control unit 330 may be referred to as a communication processor (CP).

According to various embodiments, the control unit 330 may control the terminal to carry out operations according to various embodiments to be explained. For example, the control unit 330 may receive a downlink signal (a downlink control signal or downlink data) transmitted by the base station, through the transceiving unit (e.g., the communication unit 310). Also, for example, the control unit 330 may determine a transmission result of the downlink signal. The transmission result may include feedback information of ACK, NACK, discontinuous transmission (DTX) of the transmitted downlink signal. In the present disclosure, the transmission result may be referred to as various terms such as a reception state, a reception result, a decoding result, and HARQ-ACK information of the downlink signal. In addition, for example, the control unit 330 may transmit an uplink signal, as a response signal to the downlink signal, to the base station through the transceiving unit. The uplink signal may explicitly or implicitly include the transmission result of the downlink signal. In addition, for example, the control unit 330 may include at least one or more information of the aforementioned HARQ-ACK information and/or CSI in the uplink control information, and transmit the uplink control information to the base station through the transceiving unit. In this case, the uplink control information may be transmitted together with the uplink data information over the uplink data channel, or only the uplink control information may be transmitted to the base station over the uplink data channel without the uplink data information.

The control unit 330 may perform the channel access procedure for the unlicensed band. For example, the transceiving unit (e.g., the communication unit 310) may receive signals transmitted in the unlicensed band, and the control unit 330 may determine whether the above-described unlicensed band is idle by comparing the above-stated received signal strength with the threshold which is predefined or determined to the function value having the bandwidth as the factor. The control unit 330 may perform the access procedure for the unlicensed band to transmit a signal to the base station. In addition, the control unit 330 may determine uplink transmission resources for transmitting the uplink control information by using at least one or more of a result of performing the above-described channel access procedure and the downlink control information received from the base station, and transmit the uplink control information to the base station through the transceiving unit.

Figure 4:
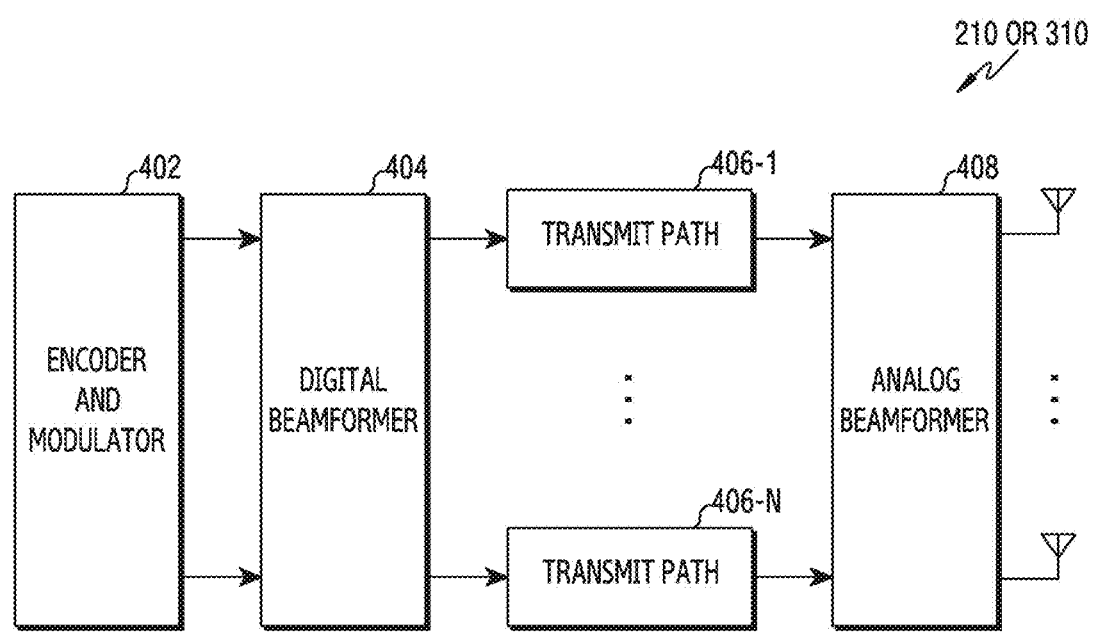
FIG. 4 illustrates a configuration of a communication unit in a wireless communication system according to various embodiments of the present disclosure.

FIG. 4 illustrates a configuration of a communication unit in a wireless communication system according to various embodiments of the present disclosure. FIG. 4 depicts an example of a detailed configuration of the wireless communication unit 210 of FIG. 2 or the communication unit 310 of FIG. 3. Specifically, FIG. 4 may illustrate components for performing the beamforming, as a part of the wireless communication unit 210 of FIG. 2 or the communication unit 310 of FIG. 3.

Referring to FIG. 4, the wireless communication unit 210 or the communication unit 310 may include an encoder and modulator 402, a digital beamformer 404, a plurality of transmit paths 406-1 through 406-N and an analog beamformer 408.

The encoder and modulator 402 may perform channel encoding. For the channel encoding, at least one of low density parity check (LDPC) code, convolution code, and polar code may be used. The encoder and modulator 402 may generate modulation symbols by performing constellation mapping.

The digital beamformer 404 may beamform a digital signal (e.g., the modulation symbols). For doing so, the digital beamformer 404 may multiply the modulation symbols by beamforming weights. Herein, the beamforming weights may be used to change signal amplitude and phase, and may be referred to as a 'precoding matrix', a 'precoder' and the like. The digital beamformer 404 may output the digital-beamformed modulation symbols to the plurality of the transmit paths 406-1 through 406-N. In so doing, according to a multiple input multiple output (MIMO) transmission scheme, the modulation symbols may be multiplexed, or the same modulation symbols may be provided to the plurality of the transmit paths 406-1 through 406-N.

The plurality of the transmit paths 406-1 through 406-N may convert the digital-beamformed digital signals into analog signals. For doing so, the plurality of the transmit paths 406-1 through 406-N each may include an inverse fast Fourier transform (IFFT) operator, a cyclic prefix (CP) adder, a DAC, and an up-converter. The CP adder is for an orthogonal frequency division multiplexing (OFDM) scheme, and may be excluded if other physical layer scheme (e.g., filter bank multi-carrier (FBMC)) is applied. That is, the plurality of the transmit paths 406-1 through 406-N may provide independent signal processes for a plurality of streams generated through the digital beamforming. Yet, depending on the implementation, some of the components of the plurality of the transmit paths 406-1 through 406-N may be used in common.

The analog beamformer 408 may beamform the analog signals. For doing so, the digital beamformer 404 may multiply the analog signals by the beamforming weights. Herein, the beamforming weights are used to change the signal amplitude and phase. Specifically, the analog beamformer 408 may be configured variously, according to a connection structure between the plurality of the transmit paths 406-1 through 406-N and the antennas. For example, each of the plurality of the transmit paths 406-1 through 406-N may be connected with one antenna array. As another example, the plurality of the transmit paths 406-1 through 406-N may be connected to one antenna array. As yet another example, the plurality of the transmit paths 406-1 through 406-N may be adaptively connected to one antenna array, or two or more antenna arrays.

Considering various services and requirements, it is necessary to flexibly define and operate a frame structure in the 5G system. For example, each service may have a different subcarrier spacing (SCS) according to the requirements. The 5G communication system currently supports a plurality of SCSs, and the SCS may be determined as $\Delta f=f_0 \cdot 2^\mu$. Herein, $f_0$ denotes a basic SCS (e.g., 15 kHz in the NR system) of the system, u denotes an integer scaling factor, and $\Delta f$ denotes the SCS. For example, if $f_0$ is 15 kHz, an SCS set of the 5G communication system may include one of 3.75 kHz, 7.5 kHz, 15 kHz, 30 kHz, 60 kHz, 120 kHz, 240 kHz, and 480 kHz. An available SCS set may differ depending on the frequency band. For example, the SCS of at least one or more of 3.75 kHz, 7.5 kHz, 15 kHz, 30 kHz, and 60 kHz may be used in the frequency band below 7 GHz, and the SCS of at least one or more of 60 kHz, 120 kHz, 240 kHz or a greater SCS may be used in the frequency band above 7 GHz.

In various embodiments, a length of a corresponding OFDM symbol may be changed depending on the SCS of the OFDM symbol. This many may be because the SCS and the OFDM symbol length have a reciprocal relationship due to characteristics of the OFDM symbol. For example, if the SCS is doubled, the symbol length may be shortened by half, and conversely, if the SCS is halved, the symbol length may be doubled.

Figure 5:
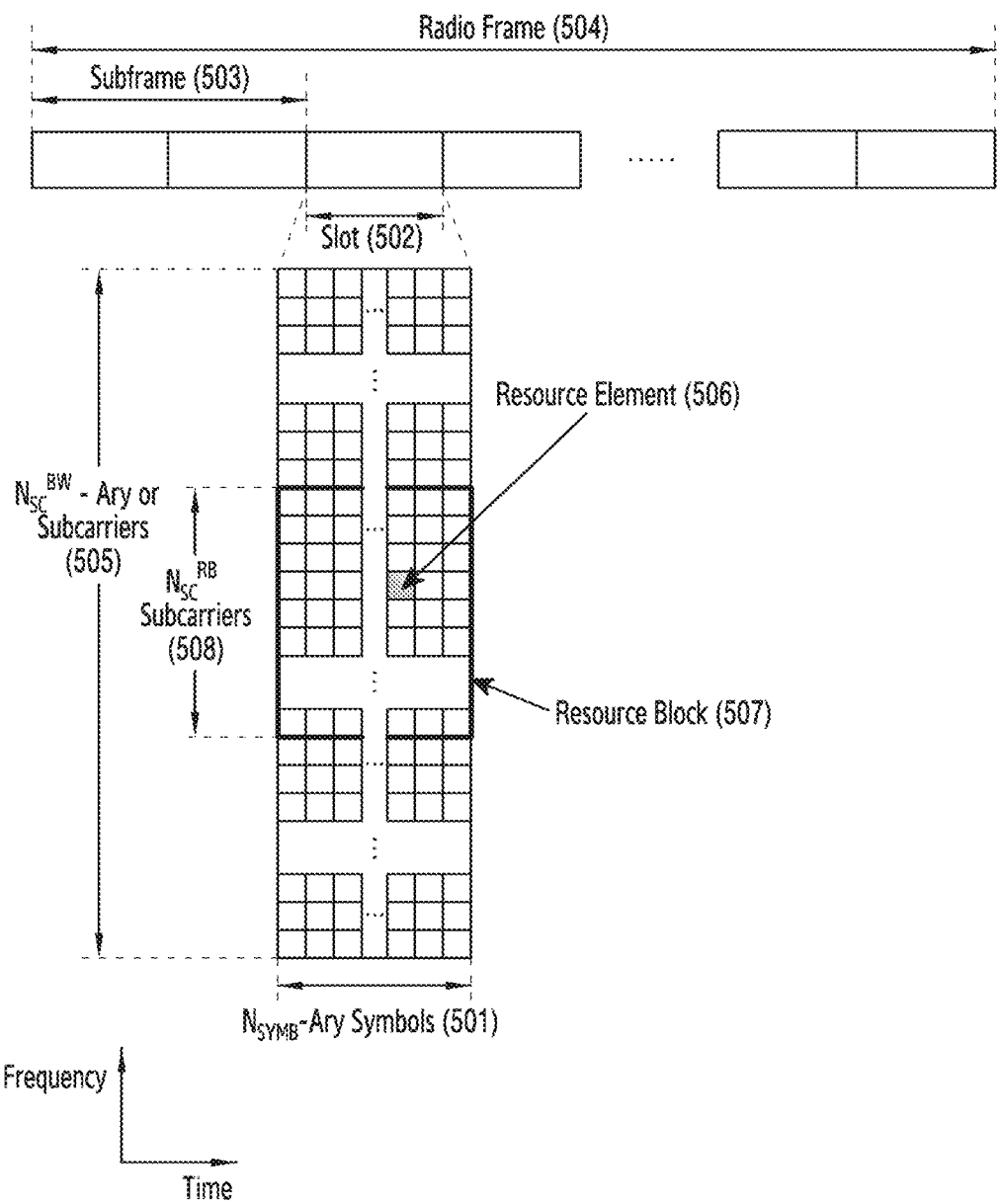
FIG. 5 illustrates an example of a radio resource region in a wireless communication system according to various embodiments of the present disclosure.

FIG. 5 illustrates an example of a radio resource region in a wireless communication system according to various embodiments of the present disclosure.

In various embodiments, the radio resource region may include a structure of a time-frequency domain. In various embodiments, the wireless communication system may include an NR communication system.

Referring to FIG. 5, a horizontal axis represents the time domain, and a vertical axis represents the frequency domain in the radio resource region. A minimum transmission unit of the time domain may be an OFDM symbol and/or DFT-s-OFDM symbol, and $N_{symb}$-ary OFDM symbols and/or DFT-s-OFDM symbols 501 may construct one slot 502. In various embodiments, the OFDM symbol may include a symbol for transmitting and receiving a signal using the OFDM multiplexing scheme, and the DFT-s-OFDM symbol may include a symbol for transmitting and receiving a signal using a DFT-s-OFDM or single carrier (SC)-frequency division multiple access (FDMA) multiplexing scheme. Hereafter, although the embodiment for the OFDM symbol is explained for convenience of description in the present disclosure, those skilled in the art shall fully understand that this embodiment may be applied to an embodiment of the DFT-s-OFDM symbol. In addition, the embodiment of the downlink signal transmission and reception is described for convenience of description in the present disclosure, but it may be applied to an embodiment related to uplink signal transmission and reception.

If the SCS is 15 kHz, unlike FIG. 5, one slot 502 may construct one subframe 503, and lengths of the slot 502 and the subframe 503 may be 1 ms each. In various embodiments, the number of the slots and the length of the slots constructing one subframe 503 may differ according to the SCS. For example, if the SCS is 30 kHz, two slots may construct one subframe 503. In this case, the slot length may be 0.5 ms and the length of the subframe 503 may be 1 ms. A radio frame 504 may be a time domain interval including 10 subframes. The minimum transmission unit of the frequency domain is the subcarrier, and a carrier bandwidth constructing a resource grid may include $N_{sc}^{BW}$-ary subcarriers 505 in total.

Yet, the SCS, the number of the slots 502 included in the subframe 503, and the length of the slot 502 may be variably applied. For example, in the LTE system, the SCS may be 15 kHz, and two slots may construct one subframe 503, wherein the length of the slot 502 may be 0.5 ms and the length of the subframe 503 may be 1 ms. As another example, in the NR system, the SCS may be one of 15 kHz ($\mu$=0), 30 kHz ($\mu$=1), 60 kHz ($\mu$=2), 120 kHz ($\mu$=3), and 240 kHz ($\mu$=4), and the number of slots included in one subframe may be 1, 2, 4, 8, or 16 according to the SCS.

A basic unit of the resource in the time-frequency domain may be a resource element (RE) 506, and the resource element 506 may be expressed by an OFDM symbol index and a subcarrier index. A resource block 507 may include a plurality of REs. In the LTE system, the resource block (RB) or physical resource block (PRB) 507 may be defined as the $N_{symb}$-ary consecutive OFDM symbols 501 in the time domain and the $N_{SC}^{RB}$-ary consecutive subcarriers 508 in the frequency domain. According to an embodiment, the number of the symbols 501 included in one RB 507 may be $N_{symb}$=14, and the number of the subcarriers 508 may be $N_{SC}^{RB}$=12. According to an embodiment, the number of the symbols 501 included in one RB 507 may be $N_{symb}$=7, and the number of the subcarriers 508 may be $N_{SC}^{RB}$=12. The number of the RBs 507 (NRB) may vary according to the bandwidth of the system transmission band.

In the NR system, the RB 507 may be defined as the $N_{SC}^{RB}$-ary consecutive subcarriers 508 in the frequency domain. The number of the subcarriers 508 may be $N_{SC}^{RB}$=12. The frequency domain may include common resource blocks (CRBs). The PRB 507 may be defined in a bandwidth part (BWP) in the frequency domain. CRB and PRB numbers may be determined differently according to the SCS.

Downlink control information (DCI) may be transmitted in the first N-ary OFDM symbol(s) in the slot. Generally, it may be N={1, 2, 3}. The number of symbols for transmitting the DCI may be predefined, or the terminal may be configured with the number of symbols for transmitting the DCI from the base station through the higher laying signaling. In addition, the base station may change the number of the symbols for transmitting the DCI in the slot for each slot according to an amount of control information to transmit in a current slot, and provide the information of the number of the symbols to the terminal over a separate downlink control channel.

In the NR and/or LTE system, scheduling information of downlink data or uplink data may be transmitted from the base station to the terminal through the DCI. In various embodiments, the DCI may be defined according to various formats. The DCI format may differ depending on whether the DCI includes scheduling information (UL grant) of uplink data, whether the DCI includes scheduling information (DL grant) of downlink data, whether the DCI is compact DCI with small-sized control information, whether the DCI is fall-back DCI, whether spatial multiplexing using multiple antennas is applied, and/or whether the DCI is DCI for power control.

For example, the DCI format (e.g., DCI format 1_0 of NR) which is the scheduling control information (DL grant) of the downlink data may include at least one of the following control information.

DCI format identifier: an identifier which identifies the DCI format

Frequency domain resource assignment: indicating RBs allocated for data transmission.

Time domain resource assignment: indicating slots and symbols allocated for data transmission.

Virtual RB (VRB)-to-PRB mapping: indicating whether to apply a VRB mapping scheme Modulation and coding scheme (MCS): indicating the modulation scheme used for data transmission and a size of a transport block which is data to transmit.

New data indicator (NDI): indicating HARQ initial transmission or retransmission Redundancy version (RV): indicating a redundancy version of HARQ HARQ process number: indicating a process number of HARQ.

Physical downlink shared channel (PDSCH) allocation index (downlink assignment index): indicating to the terminal the number of PDSCH reception results (e.g., the number of HARQ-ACKs) to be reported to the base station.

Transmit power control (TPC) command for physical uplink control channel (PUCCH): indicating a TPC command for a PUCCH which is an uplink control channel.

PUCCH resource indicator: indicating a PUCCH resource used for the HARQ-ACK report including the reception result of the PDSCH configured through corresponding DCI.

PUCCH transmission timing indicator (PDSCH-to-HARQ_feedback timing indicator): indicating slot or symbol information for transmitting the PUCCH for the HARQ-ACK report including the reception result of the PDSCH configured through the corresponding DCI.

The DCI may be transmitted on a physical downlink control channel (PDCCH) or an enhanced PDCCH (EPDCCH) through the channel coding and modulation processes. Hereafter, PDCCH or EPDCCH transmission and reception may be understood as DCI transmission and reception on the PDCCH or the EPDCCH, and PDSCH transmission and reception may be understood as downlink data transmission and reception on the PDSCH.

In various embodiments, cyclic redundancy check (CRC) scrambled with a specific radio network temporary identifier (RNTI) which is independent for each terminal, or a terminal identifier cell (C)-RNTI may be added to the DCI. The DCI for each terminal may be channel-coded, and then configured and transmitted as an independent PDCCH. The PDCCH in the time domain may be transmitted during a control channel transmission interval. A mapping position of the PDCCH in the frequency domain may be determined by a function having at least an identifier (ID) of each terminal as its factor, and may be transmitted in the entire system transmission band or a set frequency band of the system transmission band. Alternatively, the mapping position of the PDCCH in the frequency domain may be set by the higher layer signaling.

Downlink data may be transmitted on the PDSCH for downlink data transmission. The PDSCH may be transmitted generally after the control channel transmission interval, and the scheduling information such as the PDSCH mapping position in the frequency domain, and the modulation scheme for the PDSCH may be determined based on the DCI transmitted over the PDCCH.

Figure 6:
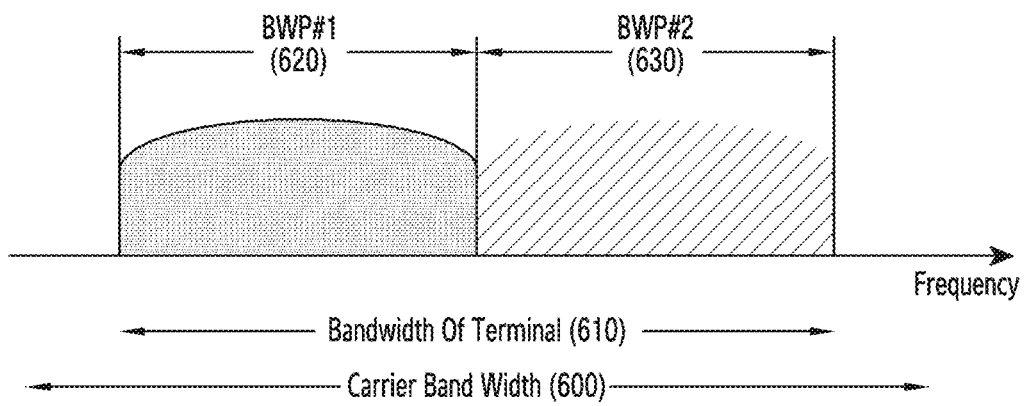
FIG. 6 illustrates an example of a bandwidth part configuration in a wireless communication system according to an embodiment of the present disclosure.

FIG. 6 illustrates an example of a BWP configuration in a wireless communication system according to an embodiment of the present disclosure.

The base station may set one or a plurality of BWPs to the terminal, wherein the size of each BWP may be equal to or smaller than the bandwidth of the carrier or the cell. FIG. 6 shows the example in which a bandwidth 610 of the terminal is set to two BWPs, that is, a BWP #1 620 and a BWP #2 630. The terminal may be configured with various parameters related to the BWP such as a BWP identifier (BWP-Id), a BWP frequency position, a SCS, and a cyclic prefix, from the base station through a higher signal. The above-described information may be delivered from the base station to the terminal through the higher layer signaling, for example, RRC signaling.

At least one BWP among one or more BWPs configured to the terminal may be activated at a specific timing, and the activated BWP may be changed. Whether to activate and/or change the configured BWP may be transmitted from the base station to the terminal in a semi-static manner through the RRC signaling, or may be transmitted dynamically through a MAC control element (CE) or DCI.

Even if the bandwidth 610 supported by the terminal is smaller than the system bandwidth or carrier bandwidth 600, the terminal may transmit and receive data to and from the base station at a specific frequency position of the system bandwidth through the BWP. In addition, the base station or the cell may support different SCSs. For example, to support data transmission and reception of the terminal using both the SCS of 15 kHz and the SCS of 30 kHz, the two BWPs may be set to use the SCSs of 15 kHz and 30 kHz respectively. The different BWPs may be frequency division multiplexing (FDM), and if data is to be transmitted and received at a specific SCS, the BWP which is set at the corresponding SCS may be changed or activated. As yet another example, the base station may allow to transmit and receive data through a high data transmission rate by setting a narrowband BWP and a broadband BWP to the terminal, minimizing the power consumption of the terminal by activating the narrowband BWP of the terminal if there is no traffic, and changing or activating the activated BWP of the terminal to the broadband BWP if data occurs in order to reduce the power consumption of the terminal.

Figure 7:
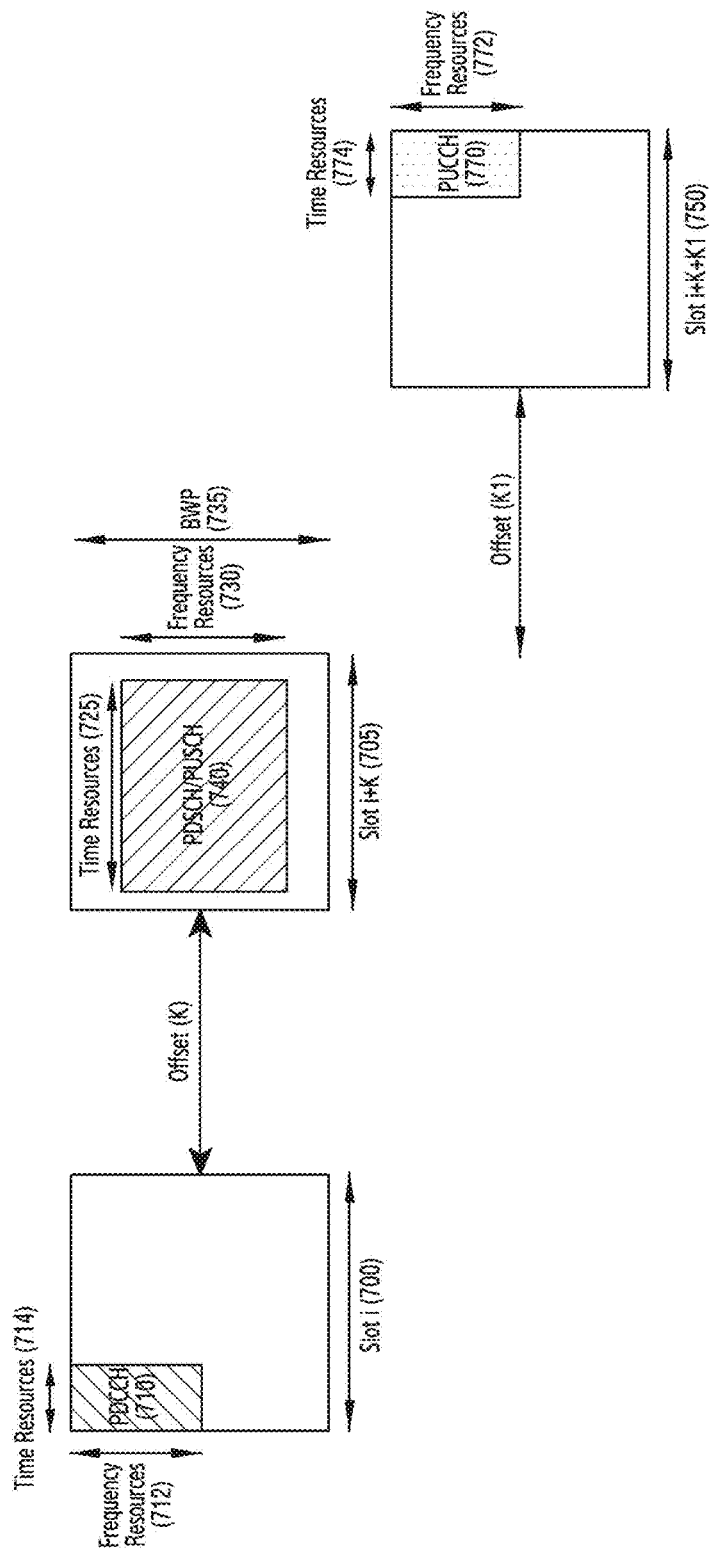
FIG. 7 illustrates an example of scheduling and feedback in a wireless communication system according to various embodiments of the present disclosure.

FIG. 7 illustrates an example of scheduling and feedback in a wireless communication system according to various embodiments of the present disclosure.

Referring to FIG. 7, the base station may transmit control information including scheduling information of a downlink and/or uplink data channel to the terminal. The base station may transmit downlink data to the terminal according to the above-described scheduling information. The terminal receiving the above-mentioned data may transmit HARQ-ACK information, which is feedback for the downlink data, to the base station. Alternatively, the terminal may transmit uplink data to the base station according to the above-described scheduling information. The base station receiving the above-mentioned data may transmit HARQ-ACK information, which is feedback for the above-described uplink data, to the terminal. At this time, the feedback may be determined by the terminal through an NDI or a new data indicator value of the scheduling information of the uplink data channel.

In the NR system, the uplink and downlink HARQ scheme may include an asynchronous HARQ scheme in which the data retransmission time is not fixed. For example, in the downlink, if NACK is fed back as the terminal's reception result of the downlink data transmitted by the base station, the base station may freely determine the retransmission time of the downlink data described above according to the base station scheduling operation. The terminal scheduled with the downlink data retransmission from the base station may buffer data determined as an error, as a result of decoding the received data for the HARQ operation with the previously received downlink data, and then combine it with the data retransmitted from the base station. The above-stated base station may be the base station 110 of FIG. 1 and the above-described terminal may be the terminal 120 and 130 of FIG. 1.

Referring to FIG. 7, the resource region for transmitting the data channel in the 5G or NR communication system is depicted. The terminal may monitor and/or search a PDCCH 710 in a downlink control channel (hereafter, PDCCH) region (hereafter, a control resource set (CORESET) or a search space (SS)) which is set through a higher signal from the base station. In this case, the downlink control channel region includes a time domain 714 and a frequency domain 712. The time domain 714 may be set on a symbol basis, and the frequency domain 712 may be set on an RB or RB group basis.

If the terminal detects the PDCCH 710 in a slot i 700, the terminal may obtain DCI transmitted over the detected PDCCH 710. Through the received DCI, the terminal may acquire scheduling information of a downlink data channel or an uplink data channel 740. In other words, the DCI may include time-frequency resource region (or PDSCH transmission region) information for at least the terminal to receive the downlink data channel (hereafter, PDSCH) transmitted from the base station, or time-frequency resource region information allocated from the base station for the uplink data channel (PUSCH) transmission of the terminal.

A case in which the terminal is scheduled to transmit the PUSCH is described by way of example as follows. The terminal receiving the DCI may obtain a slot index or offset information K for receiving the PUSCH transmitted through the DCI, and determine the PUSCH transmission slot index. For example, the terminal may determine that it is scheduled to transmit the PUSCH in a slot i+K 705 through the received offset information K, based on the slot i 700 receiving the PDCCH 710. At this time, the terminal may determine the slot i+K 705 or a PUSCH start symbol or time of the slot i+K 705 through the received offset information K, based on the CORESET receiving the PDCCH 710.

In addition, the terminal may obtain information of the PUSCH transmission time-frequency resource region 740 of the PUSCH transmission slot 705 in the above-described DCI. The information for setting the PUSCH transmission frequency resource region 730 may include physical resource block (PRB) or PRB group unit information. Meanwhile, the information for setting the PUSCH transmission frequency resource region 730 may be information related to a region included in an initial uplink bandwidth or the initial uplink BWP determined or set at the terminal through the initial access procedure. If the terminal is configured with an uplink bandwidth or an uplink BWP through a higher signal, the information for setting the PUSCH transmission frequency resource region 730 may be information related to a region included in the uplink bandwidth (BW) or the uplink BWP configured through the higher signal.

In various embodiments, the information for setting the PUSCH transmission time resource region 725 may be the symbol or symbol group unit information, or information indicating absolute time information. The information for setting the PUSCH transmission time resource region 725 may be expressed as a combination of the PUSCH transmission start time or symbol and the PUSCH length or the PUSCH end time or symbol and included as one field or value in the DCI. The terminal may transmit the PUSCH in the PUSCH transmission resource region 740 determined through the DCI. In the embodiment, the above details may be applied also to the downlink data channel (PDSCH) for transmitting downlink data.

In various embodiments, the terminal receiving the PDSCH 740 may report (feedback) a reception result (e.g., HARQ-ACK/NACK) of the PDSCH 740 to the base station. At this time, the uplink control channel (PUCCH, 770) transmission resource for transmitting the reception result (i.e., uplink control information) of the PDSCH 740 may be determined by the terminal based on a PDSCH-to-HARQ timing indicator and a PUCCH resource indicator indicated through the DCI 710 which schedules the PDSCH 740. In other words, the terminal receiving the PDSCH-to-HARQ timing indicator K1 through the DCI 710 may transmit the PUCCH 770 in a slot i+K+K1 750 after K1 from the PDSCH 740 reception slot 705.

The base station may set one or more K1 values to the terminal through the higher layer signaling, or may indicate a specific K1 value to the terminal through the DCI as described above. K1 may be determined according to HARQ-ACK processing capability of the terminal, that is, the minimum time required for the terminal to receive the PDSCH and generate and report the HARQ-ACK of the PDSCH. In addition, the terminal may use a predefined value, or a default value as the K1 value until the K1 value is set. At this time, the time at which the terminal transmits the aforementioned PDSCH reception result (HARQ-ACK) may not be indicated through one of the K1 values predefined or set through the higher signal or a non-numerical value.

In so doing, the PUCCH 770 transmission in the PUCCH transmission slot 750 may be performed on a resource indicated through the PDCCH resource indicator of the DCI 710. At this time, if a plurality of PUCCH transmissions is set or indicated in the PUCCH transmission slot 750, the terminal may perform the PUCCH transmission in other PUCCH resources than the resource indicated through the PUCCH resource indicator of the DCI 710.

In the 5G communication system, to dynamically change downlink signal transmission and uplink signal transmission intervals in a time division duplex (TDD) system, whether each of the OFDM symbols constituting one slot is a downlink symbol or an uplink symbol or a flexible symbol may be indicated by a slot format indicator (SFI). Herein, a symbol indicated as the flexible symbol may indicate neither the downlink symbol nor the uplink symbol, or may indicate a symbol which may be changed to the downlink or uplink symbol by terminal-specific control information or scheduling information. In this case, the flexible symbol may include a gap guard required in switching from the downlink to the uplink.

The SFI may be transmitted to a plurality of terminals at the same time over a terminal group (or cell) common control channel. In other words, the SFI may be transmitted over the PDCCH which is CRC-scrambled with a different identifier (e.g., SFI-RNTI) from a terminal-specific identifier (C-RNTI). In various embodiments, the SFI may include information of N-ary slots, and the value N may be an integer or natural value greater than 0, or may be a value set by the base station to the terminal through a higher signal among a set of predefined available values such as 1, 2, 5, 10, 20. In addition, a size of the SFI information may be set by the base station to the terminal through a higher signal. An example of slot formats which may be indicated by the SFI is shown in the following [Table 1].

TABLE 1

| for-mat | symbol number (or index) in one slot | | | | | | | | | | | | | |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |

TABLE 1-continued

| for-mat | symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | F | F | F | U | U |
| 33 | D | D | D | D | D | D | D | F | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | F | F | F | F | F | F | U |
| 44 | D | D | D | D | D | F | F | F | F | F | F | U | U | U |
| 45 | D | D | D | D | D | F | F | U | U | U | U | U | U | U |
| 46 | D | D | D | D | F | U | D | D | D | D | D | F | F | U |
| 47 | D | D | F | U | U | U | D | D | F | U | U | U | U | U |
| 48 | D | F | U | U | U | U | D | F | U | U | U | U | U | U |
| 49 | D | D | D | F | F | U | D | D | D | D | F | F | U | U |
| 50 | D | F | F | U | U | U | D | F | F | U | U | U | U | U |
| 51 | D | F | U | U | U | U | D | F | U | U | U | U | U | U |
| 52 | D | F | F | F | F | U | D | F | F | F | F | F | F | U |
| 53 | D | D | F | F | F | U | D | D | F | F | F | F | F | U |
| 54 | F | F | F | F | F | F | D | D | D | D | D | D | D | D |
| 55 | D | D | F | F | F | U | U | U | D | D | D | D | D | D |
| 56-254 | Reserved | | | | | | | | | | | | | |
| 255 | UE determines the slot format fo the slot based on TDD-UL-DL-ConfigurationCommon, or TDD-UL-DL-ConfigDedicated and, if any, on detected DCI formats | | | | | | | | | | | | | |

In [Table 1], D may denote the downlink, U may denote the uplink, and F may denote the flexible symbol. According to [Table 1], the total number of the supportable slot formats may be 256. In the current NR system, a maximum size of SFI information bits is 128 bits, and the SFI information bits may be a value which may be configured by the base station to the terminal through the higher signal (e.g., dci-Payload-Size). At this time, a cell operating in the licensed band or the unlicensed band may set and indicate additional slot formats as shown in the following [Table 2] using one or more additionally introduced slot formats or at least one or more modified formats of the existing slot formats. [Table 2] is a table for explaining an embodiment of the slot formats in which one slot includes the uplink (U) and the flexible symbol (F).

TABLE 2

| for-mat | symbol number (or index) in one slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | F | U | U | U | U | U | U | U | U | U | U | U | U | U |
| 57 | F | F | U | U | U | U | U | U | U | U | U | U | U | U |
| 58 | U | U | U | U | U | U | U | U | U | U | U | U | U | F |
| 59 | U | U | U | U | U | U | U | U | U | U | U | U | F | F |
| ... | | | | | | | | | | | | | | |

In various embodiments, the SFI information may include slot formats for a plurality of serving cells, and the slot format for each serving cell may be distinguished through a serving cell ID. In addition, a slot format combination for one or more slots may be included for each serving cell. For example, if the size of the SFI information bit is 3 bits and the SFI information includes an SFI for one serving cell, the 3-bit SFI information may be one of eight SFIs or SFI combinations (hereafter, SFIs) in total. In this case, the base station may indicate one SFI of the eight SFIs through a terminal group common control information (group common DCI). In various embodiments, at least one SFI of the eight SFIs may include as SFIs for a plurality of slots. For example, the following [Table 3] shows an example of 3-bit SFI information configured in the slot formats of [Table 1] through [Table 2]. Referring to [Table 3], five (slot format combination ID 0, 1, 2, 3, 4) of the SFI information are SFIs for one slot, and the remaining three are information of the SFIs (slot format combination ID 5, 6, 7) for four slots, which may be applied in sequence to four slots. In this case, the above-described SFI information may be sequentially applied from the slot receiving the above-stated SFI.

TABLE 3

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |
| 6 | 1 1 1 1 |
| 7 | 2 2 2 2 |

The terminal may receive configuration information of the PDCCH for detecting the SFI information through a higher signal, and detect the SFI according to the configuration. For example, the terminal may be configured with at least one of CORESET configuration for detecting the SFI, search space configuration, RNTI information used for CRC-scrambling the DCI transmitting the SFI information, and period and offset information of the search space through the higher signal.

Hereafter, in an embodiment of the present disclosure, up/downlink resources for transmitting a signal or data may be allocated consecutively or non-consecutively, and if a specific resource allocation type is determined, information indicating the uplink/downlink resource allocation may be interpreted according to the specific resource allocation type described above. Meanwhile, the 3GPP standard separately uses the signal and the channel, but the up/downlink transmission signal or the up/downlink transmission channel are used together without separate distinction, or the up/downlink transmission signal may be used hereafter as the meaning including both of the uplink/downlink transmission signal or the uplink/downlink transmission channel described above or the meaning representing them in the present disclosure. This may be because the technique suggested in the present disclosure may be commonly applied to both the uplink/downlink transmission signal and the uplink transmission channel. In this case, the suggestions of the present disclosure may be independently applied to each of the uplink/downlink signal or the uplink/downlink channel without separate division or description.

Hereafter, an uplink frequency resource allocation method in the NR system will be described, but may be also applied to the downlink frequency resource allocation.

Uplink resource allocation type 0

The uplink resource allocation type 0 scheme may be a scheme of allocating resources based on resource block groups (RBGs) including consecutive P-ary RBs. At this time, the size P of the above-described RBG may be set to one of Configuration 1 through Configuration 2 through a higher signal, for example, a value rbg-size of pusch-Config, and P may be determined as shown in the following [Table 4] based on the above-described information and the size of the activated uplink BWP. [Table 4] may be a table showing the BWP size and the P size according to the RBG configuration value. In this case, the size of the BWP may be the number of PRBs constructing the BWP.

TABLE 4

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number of the RBGs constituting the uplink BWP $N_{BWP}$ may be determined as $N_{RBG}$=ceiling $(N_{BWP}^{size}+N_{BWP}^{start} \mod P)/P)$. Herein, the size of the first RBG $RBG_0$ may be P–$N_{BWP}^{start}$ mod P. If the size of $(N_{BWP}^{start}+N_{BWP}^{size})$ mod P is greater than 0, the size of the last RBG $RBG_{last}$ may be $(N_{BWP}^{start}+N_{BWP}^{size})$ mod P, and if the size of $(N_{BWP}^{start}+N_{BWP}^{size})$ mod P is not greater than 0, the size of the last RBG $RBG_{last}$ may be P. The size of the other RBGs than the first and last RBGs described above may be P. At this time, $N_{BWP}^{start}$ denotes a CRB at which the BWP described above is started relatively in CRB0 and may be understood as a point at which a specific BWP starts in the CRB. $N_{BWP}^{size}$ may denote the number of the RBs included in the above-described BWP.

At this time, a length (or the size or the number of bits) of the frequency resource allocation information is equal to $N_{RBG}$, and the terminal may be configured or scheduled with the resources configured or scheduled with the uplink transmission per RBG through a bitmap including $N_{RBG}$ bits based on the RGB. For example, the terminal may determine that the RBG region which is to 1 in the above-described bitmap is the resource allocated for the uplink transmission, and the RBG region which is set to 0 is not the resource allocated for the uplink transmission. At this time, the RBG bitmap is arranged and mapped in sequence (in ascending order) along the axis of the increasing frequency. Thus, the consecutive or non-consecutive RBGs may be allocated for the uplink transmission.

Uplink resource allocation type 1

The uplink resource allocation type 1 scheme may be a scheme of allocating consecutive frequency resources within the activated uplink BWP. The frequency resource allocation information of the uplink resource allocation type 1 scheme may be indicated to the terminal through a resource indication value (RIV). The length (or the size or the number of bits) of the above-described frequency resource allocation information is equal to ceiling (log$_2$ ($N_{BWP}(N_{BWP}+1)/2$). The RIV may indicate the frequency resource allocation start $RB_{start}$ and L-ary consecutively allocated RBs $L_{RB}$ as shown in the following [Equation 1].

$$\text{If } (L_{RBs} - 1) \le \left\lfloor \frac{N_{BWP}}{2} \right\rfloor \text{ then } RIV = N_{BWP}(L_{RBs} - 1) + RB_{start} \quad \text{[Equation 1]}$$

$$\text{Else, } RIV = N_{BWP}(N_{BWP} - L_{RBs} - 1) + (N_{BWP} - 1 - RB_{start})$$

$$\text{where, } L_{RBs} \ge 1 \text{ and shall not exceed } N_{BWP} - RB_{start}$$

Herein, $N_{BWP}$ may be the size of the activated uplink BWP and may be expressed by the number of the PRBs, $RB_{start}$ may be the first PRB at which the uplink resource allocation starts, and $L_{RB}$ may be the length or the number of the consecutive PRBs. At this time, if one of the DCI (uplink grant) for configuring or scheduling the uplink transmission, for example, DCI format 0_0 is transmitted in a common search space (CSS), an initial uplink BWP size $N_{BWP,0}$ may be used as $N_{BWP}$.

In addition, one DCI format of the uplink grant, for example, DCI format 0_0 transmitted in a UE specific common search space (USS), the size or the number of the bits of the frequency resource allocation information of the uplink grant is determined based on the initial BWP size $N_{initial,BWP}$ but if the above-stated uplink grant is DCI for scheduling another activated BWP, the RIV value is $RB_{start}$=0, K, 2K, . . . , ($N_{initial,BWP}$–1)·K and $L_{RB}$=K, 2K, . . . , $N_{initial,BWP}$·K and is given as shown in the following [Equation 2].

$$\text{If } (L'_{RBs} - 1) \le \left\lfloor \frac{N_{initial,BWP}}{2} \right\rfloor \text{ then } RIV = N_{initial,BWP}(L'_{RBs} - 1) + RB'_{start} \quad \text{[Equation 2]}$$

$$\text{Else, } RIV = N_{initial,BWP}(N_{initial,BWP} - L'_{RBs} - 1) + (N_{initial,BWP} - 1 - RB'_{start})$$

$$\text{where, } L'_{RBs} = \frac{L_{RBs}}{K}, RB'_{start} = \frac{RB_{start}}{K}, L'_{RBs} = N_{initial,BWP} - RB'_{start}$$

Uplink resource allocation type 2

The uplink resource allocation type 2 scheme is a scheme in which frequency resources for transmitting an uplink signal or channel are allocated to be distributed throughout the activated uplink BWP, and is characterized in that distances or intervals between the allocated frequency resources are the same or equal. The resources are evenly distributed throughout the frequency band and the above-described uplink resource allocation type 2 may be applied only to the uplink signal and channel transmissions transmitted in a carrier or a cell or a BWP operated in the unlicensed band which needs to satisfy frequency allocation requirements such as power spectral density (PSD) requirements and occupancy channel bandwidth (OCB) condition.

Figure 8:
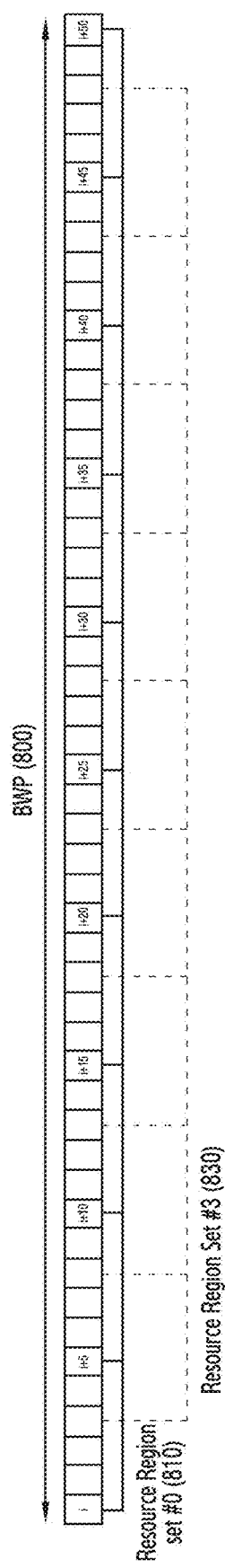
FIG. 8 illustrates an example of a process for allocating frequency resources in a wireless communication system according to various embodiments of the present disclosure.

FIG. 8 illustrates an example of a process for allocating frequency resources in a wireless communication system according to various embodiments of the present disclosure.

The uplink resource allocation type 2 scheme is described with reference to FIG. 8 as follows.

Referring to FIG. 8, a case where the terminal is configured to perform uplink signal transmission and reception with the base station through a BWP 800, and is scheduled to transmit an uplink data channel using the uplink resource allocation type 2 scheme is illustrated as an example. In FIG. 8, it is assumed that the BWP 800 includes 51 PRBs, but this is merely an example. According to the uplink resource allocation type 2 scheme, the 51 PRBs described above may include L-ary (L=5 in FIG. 8) resource region sets, and each resource region set may include $$N = \left\lfloor \frac{N_{BWP}}{L} \right\rfloor \text{ or } N = \left\lfloor \frac{N_{BWP}}{L} \right\rfloor + 1 - ary$$

PRBs. In FIG. 8, a first resource region set 810 includes 11 PRBs (#i, #i+5, #i+10, #i+15, . . . , #i+45, #i+50), and the remaining resource region set, for example, a fourth resource region set 830 includes 10 PRBs (#i+3, #i+8, #i+13, #i+18, . . . , #i+48). In other words, the number of the PRBs included in the resource region set may be different according to the size of the BWP 800 or the number of the PRBs of the BWP 800. The terminal may be allocated one or more resource region sets configured as described above. The terminal may be allocated consecutive resource region sets (e.g., resource region sets #0, #1, or #2, #3, #4) using a similar method to the uplink resource allocation type 1 scheme (e.g., the allocation based on the RIV value), or may be allocated consecutive or non-consecutive resource region sets in a similar manner to the uplink resource allocation type 0 scheme (e.g., the allocation based on the bitmap).

If the terminal is allocated the consecutive resource region sets, for example, in the similar manner to the uplink resource allocation type 1, the terminal may determine a frequency resource region (or the allocated resource region set) allocated with a resource indication value (RIV) expressed as the start resource region set $RB_{start}$ of the frequency resource allocation and L-ary consecutive resource region sets, wherein the RIV value is given by the following If $(L-1) \leq \left\lfloor \frac{N}{2} \right\rfloor$ then $RIV = N(L-1) + RB_{start}$     [Equation 3]

Else, $RIV = N(N-L-1) + (N-1-RB_{start})$

Herein, N is the total number of the resource region sets.

For example, RIV=0 denotes the first resource region set or the resource region set #0, which may indicate that one resource region set including PRB #i, #i+10, #i+20, . . . , #i+50 of FIG. 8 is allocated. At this time, the length (or the size or the number of bits) of the above-described frequency resource allocation information may be equal to ceiling ($\log_2$ (N (N+1)/2).

As another example, if consecutive or non-consecutive resource region sets are allocated using the bitmap, an L-bit bitmap indicating L-ary resource region sets constructing the above-described BWP 800 in ascending order of the frequency resource or in ascending order of the resource region set index, and the base station may allocate the resource region set through the above-described bitmap. For example, referring to FIG. 8 as an example, a position of the resource region set may be indicated through the 5-bit bitmap, and a bitmap 10000 may indicate that the first resource region set, that is, one resource region set including PRB #i, #i+10, #i+20, . . . , #i+50 of FIG. 8 is allocated. A bitmap 00010 may indicate that the fourth resource region set, that is, PRB #i+3, #i+8, #i+13, #i+18, . . . , #i+48 of FIG. 8 is allocated. In this case, the length (or the size or the number of bits) of the above-described frequency resource allocation information is equal to L.

Uplink resource allocation type 3

The uplink resource allocation type 3 scheme is a scheme in which frequency resources for the uplink signal or channel transmission are allocated to be distributed throughout the activated uplink BWP, and is characterized in that the allocation resource group (or allocated RBs or allocated clusters) which is consecutive resources is distributed in the BWP through a scheme such as repeated transmission. That is, the allocated resource group which is the consecutive resources may exist repeatedly in the frequency resource, and accordingly a plurality of allocated resource groups may exist in the BWP. Since the consecutive allocated resource group (or blocks or clusters) is distributed on the frequency domain, the above-stated uplink resource allocation type 3 may be applied only in transmitting uplink signals or channels which are transmitted in the carrier, the cell, or the BWP operating in the unlicensed band which needs to satisfy frequency allocation requirements such as PSD requirements or OCB conditions.

Similarly to the frequency, the terminal may be configured with a time resource region of an uplink data channel in the following manner. The time resource region of the uplink data channel may be indicated to the terminal through a start and length indicator value (SLIV). The SLIV is a value determined by a start symbol S of the time resource allocation and L-ary symbols consecutively allocated in a slot as follows. If (L−1) is smaller than or equal to 7, the SLIV value may be 14. (L−1)+S, and if (L−1) is greater than 7, the SLIV value may be 14·(14−L+1)+(14−1−S). At this time, the value L may be a value greater than 0 and equal to or smaller than 14.

In a system which performs communication in the unlicensed band, a communication device (the base station or the terminal) for transmitting a signal in the unlicensed band may perform the channel access procedure or the LBT on the unlicensed band for the communication before transmitting the signal, and if determining that the unlicensed band is idle according to the channel access procedure, perform the signal transmission by accessing the unlicensed band. If determining that the unlicensed band is not idle according to the conducted channel access procedure, the communication device may not perform the signal transmission.

The channel access procedure in the unlicensed band may be distinguished according to whether a channel access procedure start time of the communication device is fixed (frame-based equipment, FBE) or variable (load-based equipment). The communication device may be determined as an FBE device or an LBE device depending on whether a transmit/receive structure of the communication device has one period or no period in addition to the channel access procedure start time. Herein, the fixed channel access procedure start time may mean that the channel access procedure of the communication device may be initiated at a predefined period or on a periodic basis declared or set by the communication device. As another example, the fixed channel access procedure start time may mean that the transmit/receive structure of the communication device has one period. Herein, the variable channel access procedure start time may mean that the channel access procedure start time of the communication device is possible at any time if the communication device is to transmit a signal in the unlicensed band. As another example, the variable channel access procedure start time may mean that the transmit or receive structure of the communication device does not have one period but may be determined as needed.

Hereafter, the channel access procedure (hereafter, a traffic-based channel access procedure or an LBE-based channel access procedure) if the channel access procedure start time of the communication device is variable (LBE) is described.

The channel access procedure in the unlicensed band may include a procedure of determining the idle state of the unlicensed band by measuring a signal strength received at the communication device in the unlicensed band for a fixed time or a time calculated according to a predefined rule (e.g., a time calculated with one random value selected at least by the base station or the terminal), and comparing it with a predefined threshold or a threshold calculated by a function which determines a magnitude of the received signal strength according to at least one or more variables of a channel bandwidth, a signal bandwidth in which the signal to transmit is transmitted, and/or a transmission power level.

For example, the communication device may measure the strength of the received signal for Xus (e.g., 25 us) immediately before the signal transmission, if the measured signal strength is smaller than the predefined or calculated threshold T (e.g., −72 dBm), determine that the unlicensed band is idle, and transmit a set signal. In so doing, after the channel access procedure, a maximum time for consecutive signal transmission may be limited according to a maximum channel occupancy time (MCOT) defined by country, region, and frequency band according to each unlicensed band. In addition, the above-described maximum time may also be limited according to a communication device type (e.g., a base station or a terminal, or a master device or a slave device). For example, in Japan, a base station or a terminal in the 5 GHz unlicensed band may transmit a signal by occupying a channel without performing an additional channel access procedure up to 4 ms with respect to the unlicensed band determined to be idle after performing the channel access procedure.

More specifically, if the base station or the terminal is to transmit a downlink or uplink signal in the unlicensed band, the channel access procedure which may be performed by the base station or the terminal may be divided into at least the following types.

Type 1: transmits uplink/downlink signal after performing the channel access procedure for a variable time Type 2: performs the channel access procedure for a fixed time, and then transmits an uplink/downlink signal Type 3: transmits a downlink or uplink signal without performing the channel access procedures A transmitting device (e.g., a base station or a terminal) for transmitting a signal in the unlicensed band may determine the channel access procedure scheme (or type) according to the type of the signal to transmit. In the 3GPP, the LBT procedure which the channel access scheme may be largely divided into four categories. The four categories may include a first category which does not perform the LBT, a second category which performs the LBT without random backoff, a third category which performs the LBT through the random backoff in a fixed-sized contention window, and a fourth category which performs the LBT through the random backoff in a variable-sized contention window. According to an embodiment, in the type 1 may exemplify the third category and the fourth category, the type 2 may exemplify the second category, and the type 3 may exemplify the first category. At this time, in the type 2 or the second category which performs the channel access procedure for the fixed time may be divided into one or more types depending on the fixed time of the channel access procedure. For example, the type 2 may be divided into a type (Type 2-1) which performs the channel access procedure for a fixed time Aµs (e.g., 25 µs) and a type (Type 2-2) which performs the channel access procedure for a fixed time Bus (e.g., 16 µs).

Hereafter, for convenience of description, the transmitting device is assumed to be the base station, and the transmitting device and the base station may be mixed and used in the present disclosure.

For example, if the base station is to transmit a downlink signal including a downlink data channel in the unlicensed band, the base station may perform the channel access procedure of the type 1. If the base station is to transmit a downlink signal not including the downlink data channel in the unlicensed band, for example, if it is to transmit a synchronization signal or a downlink control channel, the base station may perform the channel access procedure of the type 2, and transmit the downlink signal.

In this case, the scheme of the channel access procedure may be determined according to a transmission length of the signal to transmit in the unlicensed band or a length of the time or the interval used by occupying the unlicensed band. Generally, the type 1 scheme may perform the channel access procedure for a longer time than performing the channel access procedure using the type 2 scheme. Hence, if the communication device is to transmit a signal for a short time duration or a time equal to or less than a reference time (e.g., Xms or Y symbols), the channel access procedure of the type 2 may be performed. By contrast, if the communication device is to transmit a signal for a long time duration or a time greater than the reference time (e.g., Xms or Y symbols), the channel access procedure of the type 1 may be performed. In other words, different channel access procedures may be performed according to the use time of the unlicensed band.

If the transmitting device performs the channel access procedure of the type 1 according to at least one of the above-described criteria, the transmitting device which is to transmit the signal in the unlicensed band may determine a channel access priority class according to a quality of service class identifier (e.g., QCI) of the signal to transmit in the unlicensed band, and perform the channel access procedure by using at least one or more values of predefined configuration values as shown in the following Table 5 with respect to the determined channel access priority class. The following Table 5 shows a mapping relationship of the channel access priority class and the QCI. At this time, the mapping relationship of the channel access priority class and the QCI as shown in Table 5 is merely an example, and is not limited to the example of Table 5.

For example, QCIs 1, 2, and 4 may indicate QCI values for services such as conversational voice, conversational video (live streaming), and non-conversational video (buffered streaming). To a signal for a service not matched to the QCI of Table 5 in the unlicensed band, the transmitting device may select a QCI closest to the service and the QCIs of the following Table 5 and select its channel access priority class.

TABLE 5

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

Parameter values for the channel access priority class (e.g., a defer duration according to the determined channel access priority p, a set $CW_p$ of contention window values or sizes and contention window minimum and maximum values $CW_{min,p}$, $CW_{max,p}$, and a maximum channel occupancy duration $T_{mcot,p}$ may be determined as shown in Table 6. Table 6 shows the parameter values for the downlink channel access priority classes.

For example, the base station for transmitting the downlink signal in the unlicensed band may perform the channel access procedure on the unlicensed band for at least $T_f+m_p*T_{sl}$ time (e.g., a defer duration). If the base station is to perform the channel access procedure with the channel access priority class 3 (p=3), the size of $T_f+m_p*T_{sl}$ may be set using $m_p=3$ with respect to the defer duration size $T_f+m_p*T_{sl}$ required to perform the channel access procedure. Herein, $T_f$ is a value fixed to 16 μs, wherein the first $T_{sl}$ time needs to be idle, and the base station may not perform the channel access procedure in the remaining time $T_f-T_{sl}$ after the time $T_{sl}$ in the time $T_f$. At this time, even though the base station performs the channel access procedure for the remaining time $T_f-T_{sl}$, the result of the channel access procedure may not be used. That is, the time $T_f-T_{sl}$ may be a time for which the base station defers the channel access procedure.

If it is determined that the unlicensed band is idle throughout the time $m_p*T_{sl}$, N=N−1. In this case, N may be selected to an arbitrary integer value among values between 0 and the contention window value $CW_p$) at the channel access procedure. For the channel access priority class 3, a minimum contention window value and a maximum contention window value may be 15 and 63 respectively. If it is determined that the unlicensed band is idle in the defer duration and an additional duration in which the channel access procedure is performed, the base station may transmit a signal in the unlicensed band for the time $T_{mcot,p}$ (8 ms). While the present disclosure is explained based on the downlink channel access priority class for convenience of descriptions, the uplink may equally use the channel access priority classes of the following [Table 6], or may use a separate channel access priority class for the uplink transmission.

TABLE 6

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The initial contention window value $CW_p$ may be the minimum value $CW_{min,p}$ of the contention window. According to an embodiment, the base station selecting the value N may perform the channel access procedure in the duration $T_{sl}$, and if determining that the unlicensed band is idle through the channel access procedure conducted in the duration $T_{sl}$, change the value to N=N−1, and transmit a signal for up to the time $T_{mcot,p}$ (or the MCOT) in the unlicensed band if N=0. If the unlicensed band determined through the channel access procedure is not idle in the time $T_{sl}$, the base station may re-perform the channel access procedure without changing the value N.

The magnitude of the value of the contention window $CW_p$ may be changed or maintained according to a ratio Z of NACKs, among reception results (ACKs/NACKs) of downlink data transmitted or reported to the base station, in other words, downlink data received in a reference subframe, a reference slot or a reference transmission time interval (TTI), by one or more terminals receiving the downlink data transmitted over a downlink data channel in the reference subframe, the reference slot or the reference TTI. In this case, the reference subframe, the reference slot or the reference TTI may be determined to the first subframe, slot or TTI of the downlink signal transmission duration (or MCOT) most recently transmitted by the base station in the unlicensed band at the time at which the base station initiates the channel access procedure, the time at which the base station selects the value N to perform the channel access procedure, or immediately before the two times, or a starting subframe, a starting slot or a starting TTI of the described transmission duration.

The terminal may transmit capability information of the supportable or performable uplink channel access procedure types to the base station. In so doing, the terminal may transmit to the base station whether each of the uplink channel access procedure types may be performed or the channel access procedure types which may be performed by the terminal through the capability information. At this time, if some types of the uplink channel access procedure types are mandatorily supported by the terminal, the terminal may deliver to the base station whether to support a specific uplink channel access procedure type through the capability information.

Similarly, the terminal may deliver capability information of a supportable or transmittable uplink signal transmission start position. In so doing, the terminal may deliver information related to whether to perform on each uplink signal transmission start position in the symbol or the uplink signal transmission start position at which the terminal may start the transmission to the base station through the capability information. At this time, if it is mandatory for the terminal to support some start positions of the uplink signal transmission start positions, the terminal may deliver to the base station through the capability information, whether it is possible to start the uplink signal transmission at a specific position.

Similarly, the terminal may deliver to the base station, capability information of a supported or transmittable uplink signal transmission end position. In this case, the terminal may deliver information of whether to perform on each of the uplink signal transmission end positions within the symbol or the uplink signal transmission end position at which the above-mentioned terminal may end transmission to the base station through the above-described capability information. In so doing, if it is mandatory for the terminal to support some end positions of the uplink signal transmission end positions, the terminal may transmit whether it is possible to end the uplink signal transmission at a specific position to the base station through the above-described capability information.

Additionally, the terminal may deliver to the base station, capability information of whether to support at least one or more functions of whether to support a function for transmitting one or more different transmission blocks through one or more uplink data channel transmissions, or whether to support the CBG-based uplink data channel transmission function through one DCI. In so doing, the terminal additionally may deliver to the base station, capability information of the maximum number of transmission blocks which may be transmitted by the terminal through one DCI or the maximum number of uplink data channels which may be scheduled through one DCI, or the maximum number of CBGs.

Additionally, the terminal may deliver to the base station, capability information of whether to support a function for simultaneously transmitting one or more signals and/or channels of the uplink control signal, the uplink control channel, and the uplink data channel. For example, the terminal may deliver to the base station the capability information of whether to support the function for simultaneously transmitting the uplink control channel and the uplink data channel. Hereafter, an embodiment of the present disclosure will be described on the assumption that the terminal does not support the function for simultaneously transmitting the uplink control channel and the uplink data channel, but is not limited thereto.

Hereafter, the present disclosure will be described on the assumption that the terminal transmits to the base station the capability information of at least one or more of the supportable uplink channel access procedure type, the uplink signal transmission start position in the symbol, the uplink signal transmission end position in the symbol, whether to support the function for transmitting one or more different transmission blocks through one or more uplink data channel transmissions through one DCI, and whether the code block-based transmission is possible, and thus the terminal uses one or more uplink channel access procedure types, the uplink signal transmission start position in the symbol, the uplink signal transmission end position in the symbol, whether to support the function for transmitting one or more different transmission blocks through one or more uplink data channel transmissions through one DCI, and the code block-based transmission. In this case, the present disclosure may be applicable even if the terminal does not transmit to the base station at least one or more capability information of the above-mentioned capability information.

Meanwhile, the above-described capability may be independent according to a frequency band or a frequency band combination. For example, capability for the type 1 and type 2 channel access procedures may be defined in the 5 GHz frequency band, and capability for the type 1, type 2, and type 3 channel access procedures may be defined in the 6 GHz frequency band. In addition, the terminal may determine at least one or more of the uplink channel access procedure type, the uplink signal transmission start position in the symbol, the uplink signal transmission end position in the symbol, whether to support the function for transmitting one or more different transmission blocks through one or more uplink data channel transmissions through one DCI, and the code block-based transmission according one of the various methods or a combination of one or more methods suggested in the present disclosure, or may determine independently according one of the various methods or a combination of one or more methods suggested in the present disclosure.

In the 7 GHz frequency band or a lower frequency band considered in the 5G communication system, one carrier may use up to 100 MHz frequency band. In this case, in the frequency band over 7 GHz or the extremely high frequency (mmWave) frequency band, one carrier may use up to 400 MHz frequency band. At this time, the terminal may communicate with the base station using some frequency band (hereafter, a BWP) of the frequency band of the carrier, and the BWP may be configured from the base station through a higher signal. The base station and the terminal communication using the unlicensed band may perform the channel access procedure on the unlicensed band before transmitting a signal in the unlicensed band. In so doing, in the unlicensed band near 5 GHz, the unlicensed band is divided into channels by 20 MHz, and various communication devices may perform the channel access procedure for each channel divided on a 20 MHz basis, and perform communications using the unlicensed band. Hence, in the 5G communication system for using the broadband, if a communication device is to perform communication through the unlicensed band, it is desirable that the communication device perform the channel access procedure on a 20 MHz basis. In other words, the base station and the terminal which communicate using the unlicensed band carrier or cell, or the BWP of the aforementioned carrier or cell may, if the bandwidth of the carrier or cell or the bandwidth of the above-described BWP is greater than 20 MHz, divide the aforementioned bandwidth or BWP (hereafter, referred to as a BWP) into one or more subbands, and perform the channel access procedure on a subband basis or on a subband group basis. In this case, the subbands may be distinguished based on the size of the carrier bandwidth or the BWP.

For example, the base station may divide the BWP into the subbands according to the carrier bandwidth or the size of the BWP configured to the terminal. An 80 MHz carrier bandwidth or bandwidth may be divided into four subbands. The size of the subband may be set for the terminal through a higher signal from the base station, which may be equal to the channel size of the unlicensed band including the carrier bandwidth or the BWP, or may be a multiple of the channel size of the unlicensed band. In addition, the size of the subband may be defined by the number of PRBs. For example, the size of the subband may be 20 MHz which is the channel size of the 5 GHz unlicensed band, or may be 40 MHz or 80 MHz which is a multiple of the channel size of the 5 GHz unlicensed band. As another example, the size of the subband may be defined by X-ary PRBs, wherein the bandwidth corresponding to the X-ary PRBs may be equal to or smaller than the 20 MHz bandwidth which is the channel size of the unlicensed band. Similarly, the subband size may be defined as Y and/or Z-ary PRBs corresponding to a bandwidth which is equal to or smaller than the 40 MHz or 80 MHz bandwidth. At this time, X, Y, and Z values for each bandwidth may be predefined between the base station and the terminal. In this case, the size of the at least one subband of the subbands may be different from the size of the other subbands. For example, if the size of the carrier bandwidth or the BWP is 50 MHz, it may be divided into three subbands. At this time, the sizes of the divided subbands may be 20 MHz, 20 MHz, 10 MHz or 10 MHz, 20 MHz, 20 MHz. The number of the subbands and/or the size of the subband described above are exemplary, and various modifications are possible. In other words, the carrier bandwidth or the BWP of 50 MHz may be divided into a subband of 40 MHz and a subband of 10 MHz. In addition, the size of each subband may be expressed by the number of the PRBs in the above-described example.

Figure 9:
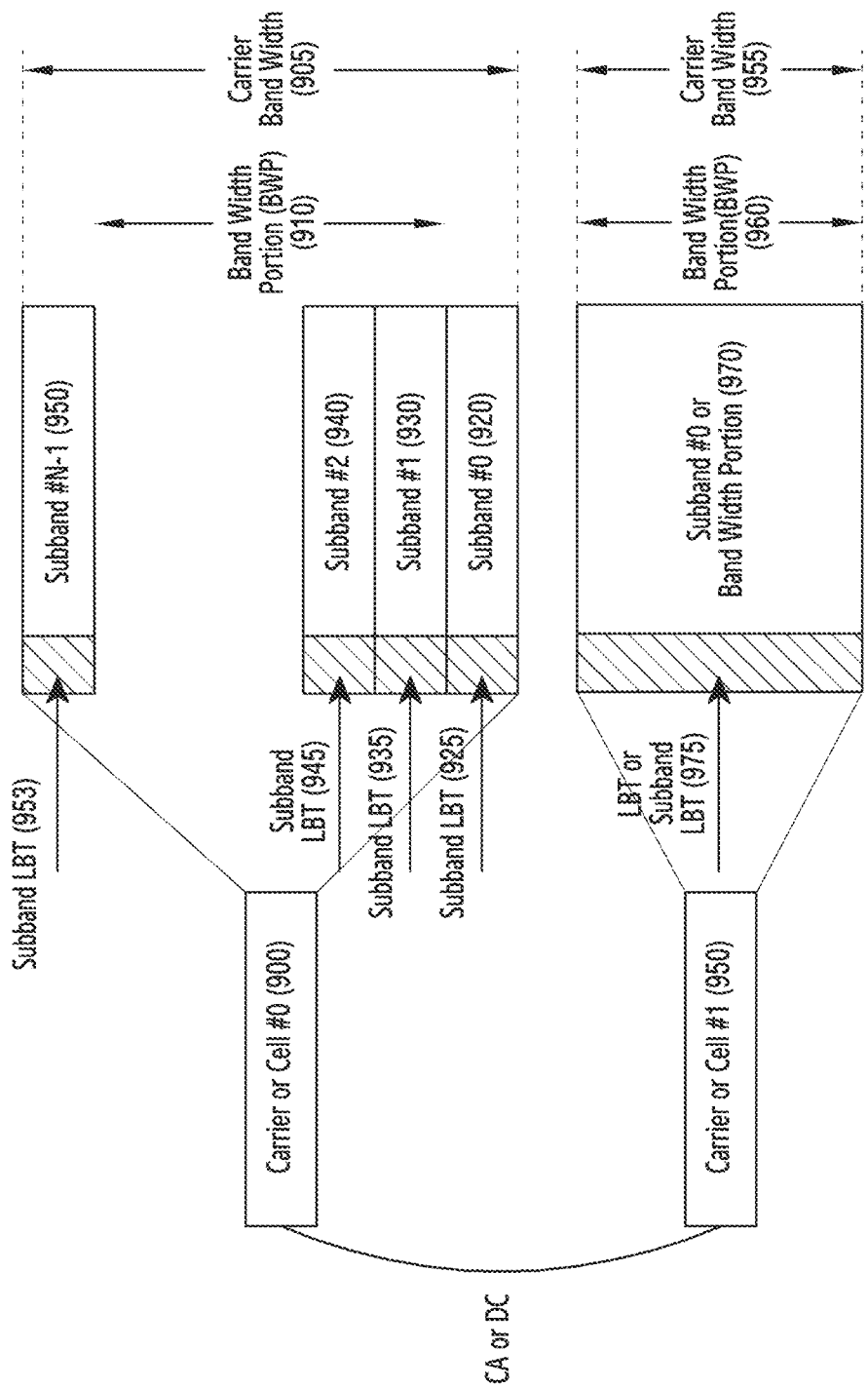
FIG. 9 illustrates an example of a process for dividing a listen before talk (LBT) subband in a wireless communication system according to various embodiments of the present disclosure.

FIG. 9 illustrates an example of a process of dividing LBT subbands in a wireless communication system according to various embodiments of the present disclosure.

More detailed descriptions are as follows using FIG. 9. FIG. 9 may show that a terminal communicates with a base station through two unlicensed band carriers or cells 900 and 950 (Hereafter, may be referred to as a cell #0 and a cell #1). In this case, sizes of carrier bandwidths 905 and 955 of the cell #0 and the cell #1 may be the same or different. In addition, the terminal may be configured with BWPs 910 and 960 which are equal to or smaller than the bandwidths 905 and 955 of the cell #0 and the cell #1 respectively. In this case, configuration information (e.g., the size of the BWP) of the BWPs 910 and 960 may be the same or different from each other. The base station may perform the channel access procedure by dividing the carrier bandwidth 905 of the cell #0 into N-ary subbands, and by dividing the carrier bandwidth 955 or the bandwidth portion 960 of the cell #1 into one subband, without separately dividing them into separate subbands as shown in FIG. 9. In so doing, the base station may divide into N'-ary subbands based on the BWP 910 of the terminal described above in the cell #0. The base station may perform channel access procedures 925, 935, 945, and 953 on the subbands in the cell #0 900 and a channel access procedure 975 on a subband #0, a carrier or a BWP 970 in the cell #1 950, and communicate through a subband determined to be idle. Thus, since the terminal is changed in the resource region for transmission and reception depending on a result of the channel access procedure for each subband of the base station, the terminal needs to receive the channel access procedure result for each subband conducted by the base station, and thus the terminal may correctly determine a frequency resource region for uplink/downlink data channel transmission and reception.

The base station may transmit the channel access procedure result to the terminal over the downlink control channel. Information indicating the channel access procedure result of the base station may be referred to as 'LBT result information' in various embodiments of the present disclosure. At this time, the LBT result information may be defined for each subband, and may include information indicating the channel access procedure result of each subband. Hereafter, various embodiments of the present disclosure will be described on the assumption that the LBT result information is defined for each subband, but the above-described LBT result information may be defined for each carrier or cell, and may include information indicating the channel access procedure result of each carrier or cell. In addition, if the carrier or the cell includes a plurality of subbands, the LBT result information may be defined for each carrier or cell and each subband, and may include information indicating the channel access procedure result of each carrier or cell and each subband.

At this time, the base station may transmit the channel access procedure result of each subband to the terminal using a bitmap. For example, a channel access procedure result of a cell including four subbands may be transmitted to the terminal through a 4-bit bitmap, wherein the bitmap may be configured in sequential order from the subband of a low subband index to the subband of a high subband index. Each bit may indicate the channel access procedure result by the base station for each subband. For example, a bit 0 may indicate that the subband is not idle, and a bit 1 may indicate that the subband is idle. The above-mentioned bit values are exemplary, and the bit values may be set the other way around. At this time, transmitting to the terminal the channel access procedure result of each subband may be expressed as transmitting to the terminal whether the base station occupies the subband (the bit 1) or does not occupy (the bit 0), or transmitting to the terminal whether the base station transmits a downlink signal in the subband (the bit 1) or does not transmit (the bit 0). At this time, transmitting to the terminal the channel access procedure result of each subband may be expressed that the base station transmits to the terminal whether a downlink signal is transmitted in the subband but is punctured (the bit 0) or the downlink signal is rate-matched to the subband (or not transmitted) (the bit 1). In other words, transmitting at the base station the channel access procedure result of each subband to the terminal may indicate that the base station may provide the terminal with information for preventing the terminal from receiving a control signal, a control channel or a data channel in a subband of channel access failure. Meanwhile, transmitting the channel access procedure result of each subband to the terminal through the bitmap is exemplary, and the base station may represent a channel access procedure result combination of each subband as a bit string, and transmit one result value of it to the terminal. If only successive subband channel access is allowed, for example, if channel access using nonconsecutive subbands such as subbands #0 and #2 is not allowed, transmitting the channel access procedure result combination of the subbands as the bit string to the terminal may minimize the bits required for the information transmission compared to transmitting the channel access procedure result to the terminal through the bitmap.

Figure 10:
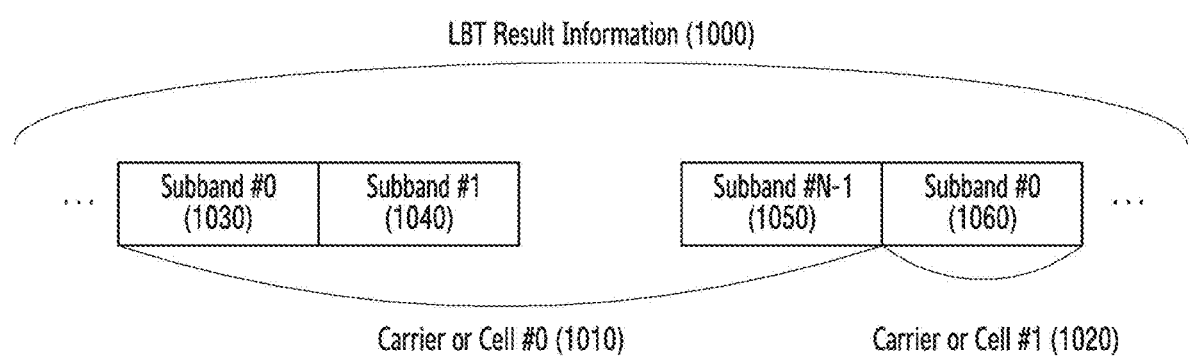
FIG. 10 illustrates an example of LBT result information in a wireless communication system according to various embodiments of the present disclosure.

FIG. 10 illustrates an example of LBT result information in a wireless communication system according to various embodiments of the present disclosure.

The base station may transmit LBT result information to one or more terminals over a downlink control channel. Since the channel access procedure result by the base station is information commonly applied to all terminals which are configured with the BWP including the subbands, if the base station transmits the channel access procedure result of each subband through cell common or group common DCI, the base station may minimize signaling required to transmit the above-described information to the terminals. In so doing, since the BWP may differ for each terminal, if the base station transmits the channel access procedure result of each subband through the cell common or group common DCI, the terminal may need to distinguish of which subband of its configured BWP the channel access procedure result of each subband commonly transmitted by the base station is information. Hence, if the base station transmits the channel access procedure result of each subband through the cell common or group common DCI, the terminal may be additionally configured with an index of the subband included in the BWP through a higher signal. At this time, the terminal may be additionally configured with the maximum number of subbands which may be included in the carrier and/or the BWP through the higher signal. This is described with reference to FIG. 10 as below.

FIG. 10 shows the example of the LBT result information transmitted by the base station. Since the above-described LBT result information may be transmitted to the plurality of the terminals, not only information corresponding to the terminal of FIG. 9 (i.e., the LBT result information of the cell #0 and the cell #1), but also information related to another cell may be included. Hence, the terminal as shown in FIG. 9 may be configured with the subband index to determine LBT result information positions 1010 and 1020 of the cell #0 and the cell #1 communicating with the base station in the above-stated LBT result information 1000.

A terminal performing uplink transmission in the unlicensed band may or may not perform at least one or more uplink transmissions of the PUCCH and/or the PUSCH according to the channel access procedure result of the base station and/or the terminal. If the terminal fails to transmit an uplink signal or channel in at least one of the cells 1010 and 1020 and/or subbands 1030, 1040, 1050, and 1060 according to the channel access procedure result, a method for determining uplink transmission power in the cells 1010 and 1020 and/or the subbands 1030, 1040, 1050, and 1060 transmitting the uplink signal or channel is required. Hence, the present disclosure may suggest a method for determining valid resources for the uplink signal or channel transmission of the terminal by using at least one or more of the channel access procedure type performed by the terminal, the size of the gap guard, and the channel access procedure result of the base station, and determining the uplink transmission power of the terminal using the same. At this time, the uplink signal or channel transmission power of the terminal may be determined through individual embodiment, a combination of embodiments, or a combination of some of embodiments of the present disclosure.

Figure 11:
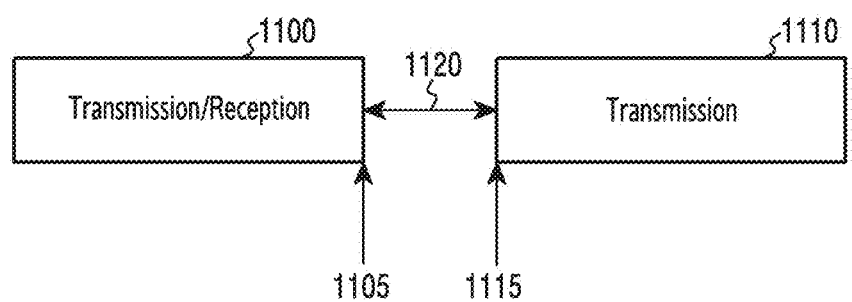
FIG. 11 illustrates an example of a gap guard between two transmissions in a wireless communication system according to various embodiments of the present disclosure.

FIG. 11 illustrates an example of a gap guard between two transmissions in a wireless communication system according to various embodiments of the present disclosure. Specifically, FIG. 11 shows the gap guard as a time for which no signal or channel is transmitted between two consecutive transmissions.

Referring to FIG. 11, if the gap guard is described in terms of the terminal, a time interval from a reception end timing 1105 of a downlink signal or channel 1100 of the terminal to a timing 1115 immediately before transmission start of the uplink signal or channel 1110 is a gap guard 1120. According to an embodiment, a time interval from the transmission end timing 1105 of an uplink signal or channel 1100 of the terminal to the timing 1115 immediately before transmission start of another uplink signal or channel 1110 may be the gap guard 1120. According to another embodiment, a time interval from the transmission end timing 1105 of the uplink signal or channel 1100 of the terminal and another terminal to the timing 1115 immediately before the transmission start of the uplink signal or channel 1110 of the terminal may be the gap guard 1120.

Referring to FIG. 11, if the gap guard is described in terms of the base station, a time interval from the reception end timing 1105 of the downlink signal or channel 1100 of the base station to the timing 1115 immediately before the transmission start of another downlink signal or channel 1110 of the base station is the gap guard 1120. According to an embodiment, a time interval from the transmission end timing 1105 of the uplink signal or channel 1100 of the terminal to the timing 1115 immediately before the transmission start of the downlink signal or channel 1110 may be the gap guard 1120.

At this time, the channel access procedure type for the transmission of the downlink or uplink signal or channel 1110 may be determined according to the size of the gap guard. According to an embodiment, if the gap guard 1120 is equal to or smaller than 16 µs, the terminal or the base station may perform one channel access procedure of the type 3 or the channel access procedure of the type 2-2 and transmit the signal or channel 1110. According to another embodiment, if the gap guard 1120 is equal to or smaller than 25 µs or greater than 16 µs and equal to or smaller than 25 µs, the terminal or the base station may perform the channel access procedure of the type 2-1 and transmit the signal or channel 1110. In this case, if the gap guard 1120 is greater than 25 µs, the terminal or the base station may perform the channel access procedure of the type 1 and transmit the signal or channel 1110.

Figure 12:
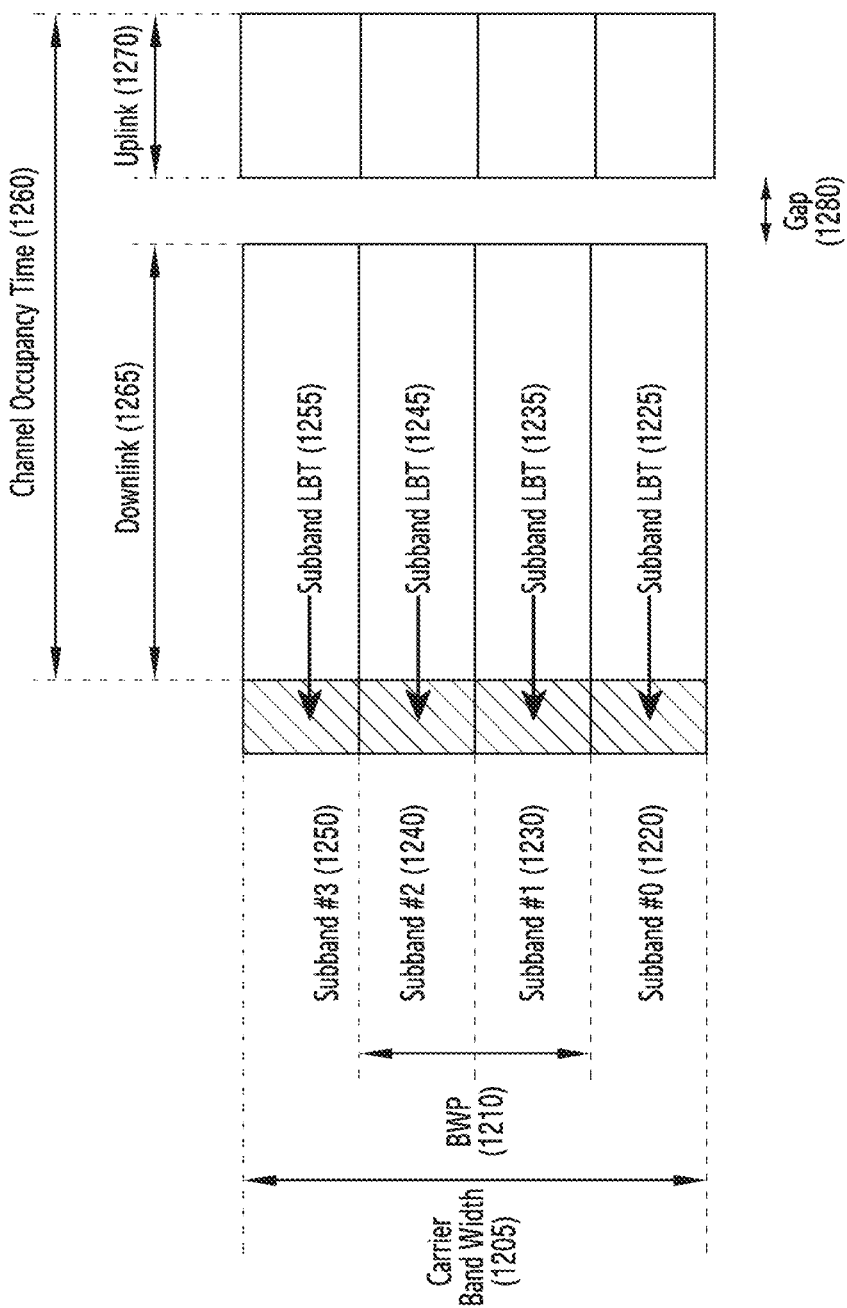
FIG. 12 illustrates an example of LBT subbands and a channel occupancy time in a wireless communication system according to various embodiments of the present disclosure.

FIG. 12 illustrates an example of LBT subbands and a channel occupancy time in a wireless communication system according to various embodiments of the present disclosure. Specifically, FIG. 12 shows the channel access procedure and the channel occupancy time per subband of the carrier or the cell #0 or #1.

Referring to FIG. 12, the base station may configure a subband #0 1220, a subband #1 1230, a subband #2 1240, and a subband #3 1250 based on a carrier bandwidth 1205, and perform the channel access procedure in each subband. After performing the channel access procedure, the base station may occupy one or more subbands determined to be idle, for example, the subband #1 1230 and the subband #2 1240, and transmit and receive a up/downlink signal to and from the terminal in the one or more subbands. At this time, the base station may transmit to the terminal, LBT result information and a time 1260 used by occupying the subbands and/or slot format structures (symbol or slot structures of at least one or more of a downlink symbol, an uplink symbol, a flexible symbol, or a gap symbol) within the channel occupancy time 1260. At this time, the LBT result information and the channel occupancy time 1260 and/or the slot format structures 1265, 1270, and 1280 within the channel occupancy time 1260 may be transmitted in the same DCI, but the LBT result information and the channel occupancy time 1260 and/or the slot format structures 1265, 1270, and 1280 within the channel occupancy time 1260 may be transmitted in independent DCI.

Figure 13:
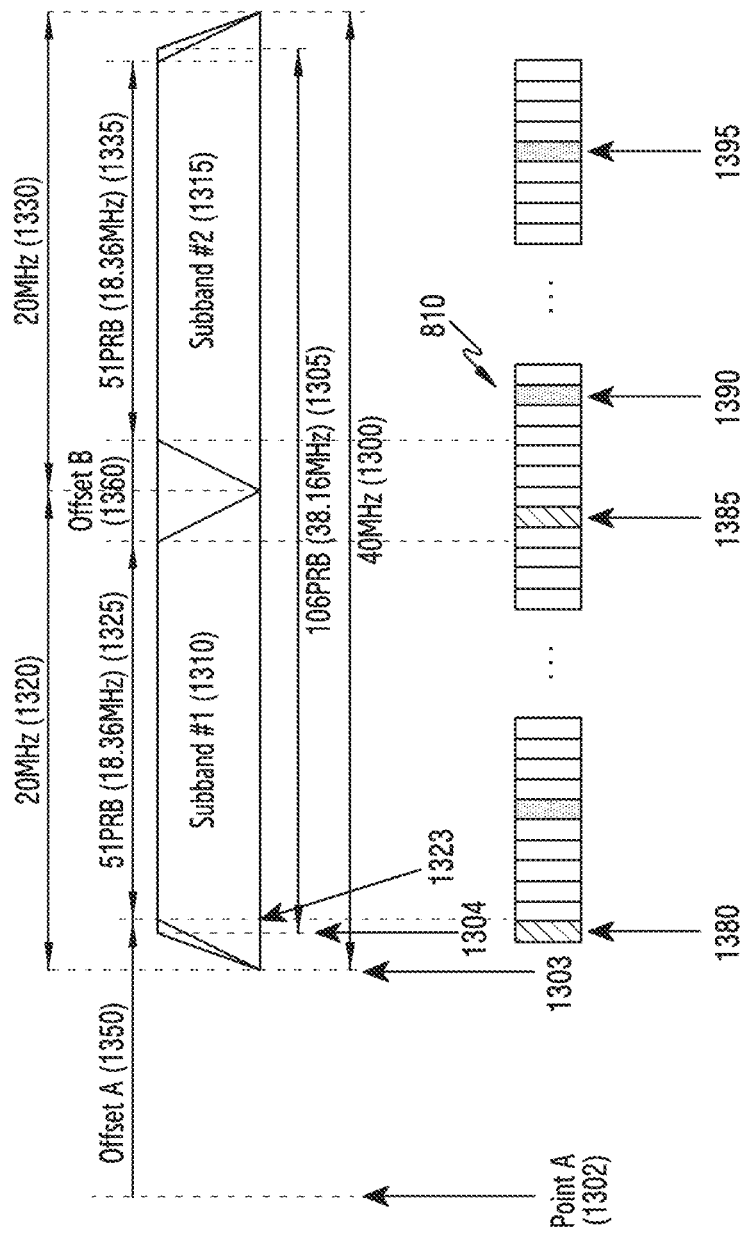
FIG. 13 illustrates an example of a process for determining valid resources for uplink transmission in a wireless communication system according to various embodiments of the present disclosure.

Referring to FIG. 13, a method of determining valid resources for uplink signal or channel transmission of the terminal using at least one or more of the channel access procedure type performed by the terminal, the size of the gap guard, and the channel access procedure result of the base station, and determining uplink transmission power of the terminal using the same is now described.

FIG. 13 illustrates an example of a process for determining valid resources for uplink transmission in a wireless communication system according to various embodiments of the present disclosure. Specifically, FIG. 13 shows that a 40 MHz system bandwidth or a BWP 1300 of the terminal having a 30 kHz subcarrier spacing (hereafter, referred to as a BWP) is divided into two 20 MHz-sized subbands 1320 and 1330.

In FIG. 13, each subband includes 51 PRBs 1325 and 1335. At this time, since the 40 MHz BWP 1300 includes 106 PRBs 1305, it is necessary to correctly define in which frequency resource region of the BWP including the 106 PRBs the two subbands including the 106 PRBs are positioned. For example, the base station performing the channel access procedure on the subband may set a start frequency resource region position of the subband within the BWP, and transmit it to the terminal. At this time, start frequency resource region position information of the subband may be transmitted to the terminal through a higher signal including SIB, and the information is between a specific reference point and a subband start frequency resource 1323 or offset information (offset A) 1350, and is on a PRB or subcarrier basis. For example, the offset information may be offset information between the lowest frequency 1303 of the BWP 1300 set by the base station to communicate with the terminal and the subband start frequency resource 1323. In this case, the offset information may be offset information between a PRB 1304 having the lowest index in the frequency resource region valid for the communication in the BWP 1300 set by the base station to communicate with the terminal, or the first subcarrier 1304 of its PRB and the subband start frequency resource 1323.

At this time, the offset information may be offset information between a frequency other than the BWP 1300 set by the base station to communicate with the terminal, for example, a point A 1302 or an absolute frequency value 1302 of the point A expressed with an absolute radio-frequency channel number (ARFCN) and the subband start frequency resource 1323.

Herein, the point A is a reference point obtained through offsetToPointA information from a synchronization signal block (SS/PBCH block), and offsetToPointA is offset information on a PRB basis. In this case, offsetToPointA is the offset information of the PRB basis expressed with 15 kHz or 60 kHz SCS, and the SCS is selected according to the frequency band. For example, for a frequency band1 (below 6 GHz frequency band, below 7 GHz band if the unlicensed band is included), offsetToPointA is PRB-based offset information expressed with 15 kHz SCS, and, for a frequency band2, offsetToPointA is PRB-based offset information expressed with 60 kHz SCS. That is, the terminal may determine that the frequency before offsetToPointA is the point A from the lowest subcarrier of the lowest PRB among the detected synchronization signal blocks. That is, the frequency after offsetToPointA from the point A becomes the frequency of the lowest subcarrier of the lowest PRB of the synchronization signal received by the terminal.

If a plurality of subbands exists in the BWP, the base station may additionally set offset information offsetB 1360 between consecutive subbands to the terminal. In this case, the offset information offsetB 1360 may be on a subcarrier or PRB basis, or may be expressed with at least one value of absolute frequency values. That is, the terminal configured with the subband size from the base station using one of the various methods of the embodiment 1 of the present disclosure may be additionally configured with the offset information offsetA 1350 indicating the subband start frequency information and the offset information 1360 between consecutive subbands from the base station through a higher signal. The terminal may correctly determine the subband frequency position in the BWP using the subband size, the offset information offsetA 1350 indicating the subband start frequency information, and the offset information 1360 between the consecutive subbands. Thus, the terminal may correctly receive a downlink signal, and also correctly perform the channel access procedure on the subband in uplink signal transmission. If the terminal performs the channel access procedure on each subband for the uplink transmission, it is advantageous that the subband frequency domain positions are identically aligned between terminals. In other words, this is because one or more terminals configured with the uplink transmission perform the channel access procedure for the same time and the same frequency domain and thus access the same channel. That is, if the terminal performs the channel access procedure on each subband for the uplink transmission, it is valid to identically align the subband frequency domain positions between the terminals for uplink signal transmission multiplexing of the terminals. Accordingly, as proposed in the embodiment of the present disclosure, it is efficient that the base station transmits information of at least one or more of the subband size, the offset information offsetA 1350 indicating the subband start frequency information, or the offset information offsetB 1360 between the consecutive subbands to the terminal through a higher signal including the SIB, and the terminal receiving it correctly determines the subband position in the BWP. In so doing, the information of at least one or more of the offset information offsetA 1350 indicating the subband start frequency information and the offset information offsetB 1360 between the consecutive subbands may not be configured to the terminal. For example, if the subbands are successively positioned, the offsetB 1360 may not be configured to the terminal. In this case, the offsetB 1360 may be set to 0.

As another example, if the subband start frequency information may be predefined based on one of frequency information of the BWP for performing the communication, the offset information offsetA 1350 indicating the subband start frequency information may not be configured to the terminal. For example, if the subband is predefined to position based on an absolute start frequency value 1303 of the BWP 1300 of FIG. 13, or if the subband is predefined to position based on the lowest PRB of an valid frequency band 1305 of the BWP 1300 of FIG. 13 or the lowest subcarrier 1304 of the lowest PRB, the offset information offsetA 1350 indicating the subband start frequency information may not be configured to the terminal.

Reception of the downlink signal and/or channel (hereafter, downlink signal reception) or transmission of the uplink signal and/or channel (hereafter, uplink signal transmission) may be scheduled or configured from the base station. At this time, at least one resource of the frequency resources scheduled or configured from the base station may be a resource not valid for the downlink signal reception or the uplink signal transmission, and a method for the terminal to determine this is as follows. This is the same as a method for the terminal to determine a resource valid for the downlink signal reception or the uplink signal transmission among the frequency resources scheduled or configured from the base station.

Hereafter, the present disclosure will mainly describe a method for determining an valid resource for an uplink control channel or an uplink data channel, and a method for determining transmission power, but the method proposed in the present disclosure may be applied to another uplink control signal or uplink control channel such as a sounding reference signal (SRS) and a physical random access channel (PRACH).

Method 1: a frequency resource which is not idle as a result of performing the channel access procedure of the base station or the terminal Method 1 is a method which determines the frequency resource included in at least one of a carrier, a cell, or a subband determined to be not idle as the channel access procedure result of the base station or the terminal as the resource not valid for the downlink signal reception or the uplink signal transmission. In other words, it is the method of determining the frequency resource included in one of the carrier, the cell, or the subband determined to be idle as the channel access procedure result of the base station or the terminal as the valid resource for the downlink signal reception or the uplink signal transmission. At this time, the terminal may receive channel access procedure result information of the base station or channel occupancy information of the base station from the base station over the downlink control channel, or the terminal may detect at least one information of a reference signal and uplink/downlink scheduling information to thus determine the channel access procedure result, whether the base station occupies the channel or whether the base station transmits a downlink signal.

Method 2: This is a method of determining a frequency resource included in a guard band in a system bandwidth or a BWP divided into a plurality of subbands as a resource not valid for the downlink signal reception or the uplink signal transmission. In other words, it is the method of determining the frequency resource not included in the guard band among frequency resources scheduled from the base station for the downlink signal reception or the uplink signal transmission as the valid resource for the downlink signal reception or the uplink signal transmission.

In this case, information of at least one or more of a position and a size of the guard band may differ according to the subband occupied by the base station or the terminal. For example, in FIG. 13, a resource 1385 is a resource included in the guard band if the base station occupies the subband #1 or the subband #2, but the resource 1385 may be the valid resource, rather than the resource included in the guard band, if the base station occupies both the subband #1 and the subband #2. Hence, the method 2 may determine the valid resource for the uplink signal transmission based on the guard band determined according to the subband occupied by the base station or the terminal. At this time, the method 2 may assume that every guard band (e.g., a guard band (e.g., 1360) between the subbands) exists regardless of the subband occupied by the base station or the terminal, and determine the valid resource for the uplink signal transmission based on this. In other words, the method 2 may determine the valid resource for the uplink signal transmission based on the guard band if the base station or the terminal occupies one subband.

Method 3: This is a method of determining a frequency resource included in a frequency resource on which the channel access procedure is not performed as a resource not valid for the downlink signal reception or the uplink signal transmission. In other words, this is the method of determining the frequency resource on which the channel access procedure is performed among the frequency resources scheduled from the base station for the downlink signal reception or the uplink signal transmission as the valid resource for the downlink signal reception or the uplink signal transmission.

Various methods of the present disclosure will be described below in more detail with reference to FIG. 13. For example, as shown in FIG. 13, the terminal configured with a subband #1 1310 and a subband #2 1315 for the BWP 1300 may be scheduled or configured with the downlink signal reception or the uplink signal transmission from the base station.

According to an embodiment, the terminal may be scheduled with resources such as the resource region set 810 of FIG. 8 from the base station as uplink transmission resources. If one or more PRB or RE (1380 and/or 1385) resources (hereafter, referred to as resources or frequency resources) of the uplink transmission resources 810 are included in the guard band in the system bandwidth or BWP divided into subbands, the terminal may determine that the resources included in the guard band among the system bandwidth or the BWP divided into subbands of the uplink transmission resources 810 are not valid resources for the uplink transmission. In other words, the terminal may determine that other resources than the resources included in the guard band of the system bandwidth or the BWP divided into subbands, among the uplink transmission resources scheduled or configured from the base station, are valid resources for the uplink transmission.

According to another embodiment, if the terminal is scheduled with resources such as the resource region set 810 of FIG. 8 from the base station as uplink transmission resources, but one or more resources 1380 and/or 1385 are not included in the bandwidth of the channel access procedure or corresponding resources, the terminal may determine that the resources not included in the bandwidth of the channel access procedure or the corresponding resources among the uplink transmission resources 810 are not valid resources for the uplink transmission. In other words, the terminal may determine that the resources which are not the bandwidth of the channel access procedure or the corresponding resources among the uplink transmission resources 810 are not valid resources for the uplink transmission. In other words, the terminal may determine that the bandwidth of the channel access procedure or the corresponding resources, among the uplink transmission resources scheduled or configured from the base station, are valid resources for the uplink transmission.

According to another embodiment, the terminal may be scheduled with resources such as the resource region set 810 of FIG. 8 from the base station as uplink transmission resources, but may determine that uplink resources included in a subband determined as not being occupied by the base station according to LBT result information received from the base station are not the valid resources for the uplink transmission. For example, if the base station performs the channel access procedure on the subband #1 1310 and the subband #2 1315, and occupies the subband #1 1310 but does not occupy the subband #2 1315 as a result of the channel access procedure, the base station may transmit information of the channel access procedure result, that is, the LBT result information, to the terminal over the downlink control channel. The terminal receiving the LBT result information may determine that resources 1390 and 1395 included in the subband #2 1315 not occupied by the base station are not valid resources for the scheduled uplink transmission. In other words, the terminal may determine that resources included in the subband indicated to be occupied by the base station, among the uplink transmission resources scheduled or configured from the base station, are the valid resources for the uplink transmission.

Figure 14:
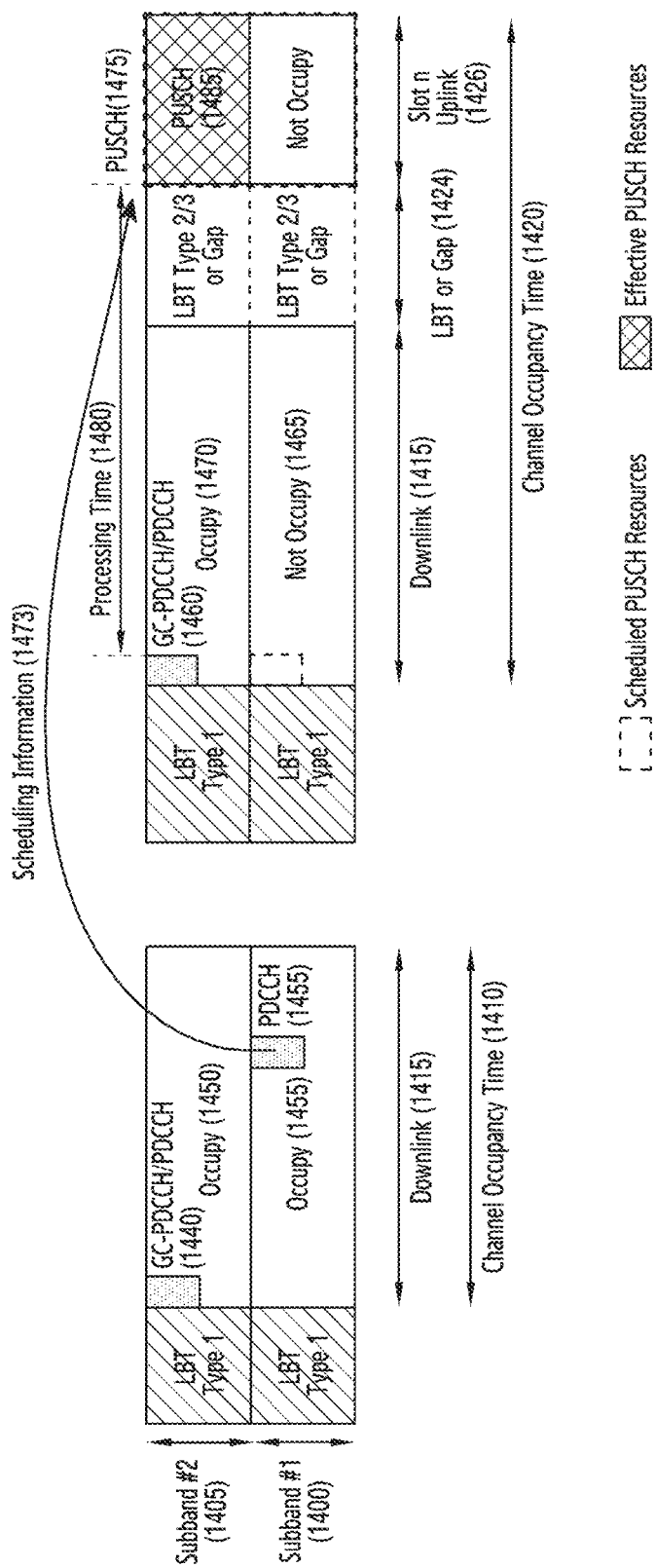
FIG. 14 illustrates an example of a process for determining valid resources for uplink transmission in a wireless communication system according to various embodiments of the present disclosure.

FIG. 14 illustrates an example of a process for determining valid resources for uplink transmission in a wireless communication system according to various embodiments of the present disclosure.

Another embodiment will be described below with reference to FIG. 14. The base station may divide the system bandwidth or the BWP of the terminal into a subband #1 1400 and a subband #2 1405, and perform the channel access procedure on each subband. The base station may occupy the subband determined to be idle according to a result of the channel access procedure and thus transmit a downlink signal or receive an uplink signal.

FIG. 14 shows that the base station uses the subband #1 1400 and the subband #2 1405 determined to be idle for downlink 1415 signal transmission for a channel occupancy time 1410. In this case, the base station may transmit at least one or more information of LBT result information 1445 and 1450, channel occupancy time 1410 information, and SFI 1415 information within the channel occupancy time 1410 to the terminal over a downlink control channel 1440. In addition, the base station may transmit a downlink control channel for scheduling uplink signal transmission to one or more terminals within the channel occupancy time 1410, wherein the uplink signal transmission of the terminal may be performed for the channel occupancy time 1410 of the base station or at a time or slot after the channel occupancy time 1410.

FIG. 14 shows an example where the base station transmits uplink scheduling information 1473 allowing to transmit an uplink signal at a time after the channel occupancy time 1410 of the base station to the terminal over a downlink control channel 1450 of the channel occupancy time 1410. After the channel occupancy time 1410 ends, the base station may re-perform the channel access procedure in each subband, and occupy the subband determined to be idle according to the result of the channel access procedure to thus transmit a downlink signal or receive an uplink signal.

FIG. 14 shows that the base station occupies the subband #2 1405 determined to be idle for a channel occupancy time 1420, and slot format information of the channel occupancy time 1420 includes a downlink 1422, a gap 1424, and an uplink 1426. The base station may transmit at least one or more information of LBT result information 1465 and 1470, channel occupancy time 1420 information, and SFI 1422, 1424, and 1426 information within the channel occupancy time 1420 to the terminal over a downlink control channel 1460. The terminal may determine uplink signal transmission resources 1475 scheduled through the uplink scheduling information 1473 transmitted over the downlink control channel 1455 pre-received through the LBT result information 1465 and 1470 of the base station, the channel occupancy time 1420 of the base station and its SFI information 1422, 1424, and 1426. In other words, if the uplink signal transmission 1475 scheduled 1480 from the base station is performed in a symbol or a slot indicated to be an uplink symbol or slot 1426 of the channel occupancy time 1420 of the base station, the terminal may determine that uplink signal transmission resources 1485 included in the subband #2 indicating that the base station occupies the channel in the uplink signal transmission resources 1475 scheduled from the base station according to the LBT result information 1465 and 1470 are valid resources for uplink signal transmission.

At this time, the terminal may receive the LBT result information 1465 and 1470 transmitted by the base station, decode them and thus differently determine the valid resources for the uplink signal transmission according to the minimum processing time 1480 required to obtain the LBT result information 1465 and 1470. For example, if a time immediately from the first or last symbol transmitting the downlink control channel over which the terminal receives the LBT result information 1465 and 1470 transmitted by the base station immediately before the first symbol initiating the uplink signal transmission is equal to or longer than the processing time 1480, the terminal may determine that the uplink signal transmission resources 1485 included in the subband #2 indicating that the base station occupies the channel in the uplink signal transmission resources 1475 scheduled from the base station according to the LBT result information 1465 and 1470 are valid resources for uplink signal transmission. If the time immediately from the first or last symbol transmitting the downlink control channel over which the terminal receives the LBT result information 1465 and 1470 transmitted by the base station immediately before the first symbol initiating the uplink signal transmission is shorter than the processing time 1480, the terminal may determine that the uplink signal transmission resources 1475 scheduled from the base station are valid resources for the uplink signal transmission.

Herein, the processing time 1480 is the time required for the terminal to receive uplink scheduling information from the base station, and to perform the uplink signal transmission according to the received scheduling information. In other words, it is the time immediately after the last symbol of the PDCCH transmitting the uplink scheduling information immediately before the first symbol of the uplink signal transmission transmitted according to the scheduling information, which needs to be equal to or greater than a minimum time required for the processing of the terminal. At this time, since the 5G or NR system generally performs the symbol-based transmission and reception, the minimum required processing time may be expressed as the minimum number of necessary symbols immediately after the last symbol of the PDCCH transmitting the uplink scheduling information immediately before the first symbol of the uplink signal transmission transmitted according to the scheduling information. In other words, if the first symbol of the uplink signal transmission starts immediately after the last symbol of the PDCCH scheduling the uplink signal transmission before an $L_2$ symbol, the terminal, which may not transmit the uplink signal, may ignore the uplink scheduling information. At this time, $L_2$ is the first symbol starting cyclic prefix (CP) immediately after the last symbol of the PDCCH scheduling the uplink signal transmission before the L2 symbol starting the transmission after the following [Equation 4]. In this case, the symbol of the terminal may include timing advance, and a time difference effect between a plurality of carriers or cells during the above time.

$$T_{proc,2} = \max((N_2 + d_{2,1})(2048 + 144) \cdot \kappa 2^{-\mu} \cdot T_c, d_{2,2})  \quad \text{[Equation 4]}$$

Herein, $N_2$ is a value determined according to the processing capability of the terminal and the SCS based on the following [Table 7] and [Table 8]. Herein, $\mu=0$, 1, 2, and 3 indicate the SCS 15 kHz, 30 kHz, 60 kHz and 120 kHz respectively. In this case, u is the SCS which produces the greatest $T_{proc,2}$ value as the result of [Equation 4], among the SCS of the PDCCH transmitting the uplink scheduling information and the SCS of the PUSCH.

If only the DM-RS is transmitted in the first symbol of the uplink signal, $d_{2,1}=0$, and otherwise, $d_{2,1}=1$. In addition, if the uplink scheduling information indicates BWP switching, $d_{2,2}$ is equal to the time required for the BWP switching of the terminal. $d_{2,2}=0$ if the uplink scheduling information does not indicate the BWP switching.

TABLE 7

| μ | PUSCH preparation time $N_2$ [symbols] |
|---|---|
| 0 | 10 |
| 1 | 12 |
| 2 | 23 |
| 3 | 36 |

TABLE 8

| μ | PUSCH preparation time $N_2$ [symbols] |
|---|---|
| 0 | 5 |
| 1 | 5.5 |
| 2 | 11 for frequency range 1 |

The above-described [Table 7] is the value $N_2$ provided by UE capability 1, and [Table 8] is the value $N_2$ provided by UE capability 2. A terminal supporting the UE capability 2 may be configured to apply one processing time of [Table 7] or [Table 8] through a higher signal. For example, if processingType2Enabled of PUSCH-ServingCellConfig is enabled, the processing time is applied according to the value $N_2$ provided by the UE capability 2 as shown in [Table 8], and otherwise, the processing time is applied according to the value $N_2$ provided by the UE capability 1 of [Table 7]. κ and $T_c$ are defined as the following [Equation 5].

[Equation 5]

$$T_c = 1/(\Delta f_{max} \cdot N_f), \Delta f_{max} = 480 \cdot 10^3 \text{ Hz}, N_f = 4096,$$

$$k = T_S/T_c = 64, T_s = \frac{1}{(\Delta f_{ref} \cdot N_{f,ref})}, f_{ref} = 15 \cdot 10^3 \text{ Hz}, N_{f,ref} = 2048$$

The terminal may determine the uplink transmission power by using the valid resources for the uplink signal transmission determined through various methods of the present disclosure. For example, the terminal may determine the uplink transmission power by using the uplink signal transmission resource information included in the uplink scheduling information (e.g., UL grant) received from the base station, or determine the uplink transmission power by using the valid resources for the uplink transmission determined using one or more methods of the above-described methods, among the uplink transmission resources included in the uplink scheduling information received from the base station. In so doing, the uplink transmission power of the terminal is determined by not only the uplink transmission resources but also various parameters, but the present disclosure will explain the uplink transmission power determining method according to the uplink transmission resources, among the various parameters which determine the uplink transmission power.

Hereafter, for convenience of explanation, determining the uplink transmission power according to the uplink signal transmission resource information included in the uplink scheduling information received from the base station at the terminal is referred to as a first uplink transmission power determining method, and the uplink transmission power determined by the first uplink transmission power determining method is referred to as first uplink transmission power. Similarly, determining the uplink transmission power according to the valid resources for the uplink transmission determined using one or more methods of the various methods of the present disclosure in the uplink signal transmission resource information included in the uplink scheduling information received at the terminal from the base station is referred to as a second uplink transmission power determining method, and the uplink transmission power determined by the second uplink transmission power determining method is referred to as second uplink transmission power.

Meanwhile, the transmission power control or the first uplink transmission power determining method for the uplink control channel of the wireless communication system is given by the following [Equation 6].

Herein, $P_{PUCCH,b,f,c}(i, q_u, q_d, l)$ denotes transmission power of the PUCCH transmitted through a PUCCH transmission occasion i using a transmission power control adjustment state with index l in an activated uplink BWP b of a carrier f of a cell c at the terminal. Each parameter in [Equation 6] is as follows.

$P_{CMAX,f,c}(i)$ is a maximum output power configured at the PUCCH transmission occasion i of the carrier f of the cell c.

$P_{O\_PUSCH,b,f,c}(q_u)$ is the parameter including $P_{O\_NOMINAL\_PUCCH,f,c}+P_{O\_UE\_PUCCH,f,c}(q_u)$, and is a value notified by the base station to the terminal through the higher signal signaling.

$M_{RB,b,f,c}^{PUCCH}(i)$ is PUCCH transmission frequency resources scheduled or configured at the PUCCH transmission occasion i and may be expressed by the number of PRBs or the number of REs.

$PL_{b,f,c}(q_d)$ is a downlink pathloss value measured by the terminal using a reference signal index $q_d$ transmitted in the activated downlink BWP, and the reference signal index may be configured from the base station through a higher signal (e.g., PUCCH-PathlossReferenceRS).

$\Delta_{F_{PUCCH}}(F)$ is a value transmitted and configured to the terminal through a higher signal and is a value which varies according to the format of the transmitted PUCCH.

$\Delta_{TF,b,f,c}(i)$ is a PUCCH transmission power adjustment component value and $\Delta_{TF,b,f,c}(i)=10 \log_{10}(N_{ref}^{PUCCH}/N_{symb}^{PUCCH}(i))+\Delta_{UCI}(i)$ for the PUCCH format 0 or 1. At this time, $N_{symb}^{PUCCH}(i)$ is the number of PUCCH transmission OFDM symbols. $N_{ref}^{PUCCH}=2$ and $\Delta_{UCI}(i)=0$ in the PUCCH format 0, and $N_{ref}^{PUCCH}=N_{symb}^{slot}$ and $\Delta_{UCI}(i)=10 \log_{10}(O_{CSI}(i))$ for the PUCCH format 1.

If the number of uplink control information (UCI) bits is equal to or smaller than 11 in the PUCCH format 2, 3 or 4, $\Delta_{TF,b,f,c}(i)=10 \log_{10}(K_1 \cdot (n_{HARQ-ACK}(i)+O_{SR}(i)+O_{CSI}(i))/N_{RE}(i))$. At this time, $K_1=6$. $n_{HARQ-ACK}(i)$ is the number of HARQ-ACK bits. If the terminal does not receive pdsch-HARQ-ACK-Codebook configuration information through the higher signal, $n_{HARQ-ACK}(i)=1$ if the HARQ-ACK information is included in the PUCCH transmission, and $n_{HARQ-ACK}(i)=0$ the HARQ-ACK information is not included. $O_{SR}(i)$ and $O_{CSI}(i)$ are scheduling request (SR) information and the number of CSI information bits transmitted at the PUCCH transmission occasion i respectively. $N_{RE}(i)$ is the number of REs transmitting the PUCCH and $N_{RE}(i)=M_{RB,b,f,c}^{PUCCH}(i) \cdot N_{SC,ctrl}^{RB}(i) \cdot N_{symb-UCI,b,f,c}^{PUCCH}(i)$. $N_{SC,ctrl}^{RB}(i)$ is the number of other subcarriers than the

[Equation 6]

$$P_{PUCCH}(i, q_u, q_d, l) = $$
$$\min \begin{cases} P_{CMAX,f,c}(i) \\ P_{0\_PUCCH,b,f,c}(q_u) + 10\log_{10}(2^\mu \cdot M_{RB,b,f,c}^{PUCCH}(i)) + PL_{b,f,c}(q_d) + \Delta_{F_{PUCCH}}(F) + \Delta_{TF,b,f,c}(i) + g_{b,f,c}(i, l) \end{cases} [dBm]$$

subcarrier transmitting the DM-RS among the number of subcarriers included in one RB. $N_{symb-UCI,b,f,c}^{PUCCH}(i)$ is the number of other symbols than the OFDM symbol transmitting the DM-RS among the number of PUCCH symbols transmitted at the PUCCH transmission occasion i.

If the number of the UCI bits is greater than 11 in the PUCCH format 2, 3 or 4, $\Delta_{TF,b,f,c}(i)=10\log_{10}(2^{K_2 \cdot BPRE(i)}-1)$. At this time, $K_2=2.4$, and $BPRE(i)=(O_{ACK}(i)+O_{SR}(i)+O_{CSI}(i)+O_{CRC}(i))/N_{RE}(i)$. If the terminal does not receive the pdsch-HARQ-ACK-Codebook configuration information through the higher signal, $O_{ACK}(i)=1$ if the HARQ-ACK information is included in the PUCCH transmission, and $O_{ACK}(i)=0$ if the HARQ-ACK information is not included. $O_{SR}(i)$, $O_{CSI}(i)$, and $O_{CRC}(i)$ are the SR information, the CSI information, and the number of CRC bits transmitted at the PUCCH transmission occasion i respectively.

- $g_{b,f,c}(i, l)$ is a transmission power control adjustment state parameter at the PUSCH transmission occasion i in the activated uplink BWP b of the carrier f of the cell c and is the parameter for performing the power control with a closed-loop. The base station may correct or control the PUSCH transmission power in a UE specific manner, in an accumulation-based manner unlike the PUSCH, and detailed descriptions thereof will be omitted.

Meanwhile, the transmission power control or the first transmission power determining method for the uplink data channel of the wireless communication system is given by the following [Equation 7].

of the uplink scheduling information (UL grant). For example, the terminal may measure the path loss by using a reference signal mapped to an SRS resource indication (SRI) field value of the uplink scheduling information.

$\alpha_{b,f,c}(j)$ is one of values including values between 0 and 1 and may be set through a higher signal from the base station with respect to the transmission power parameter set j.

$\Delta_{TF,b,f,c}(i)$ is $\Delta_{TF,b,f,c}(i)=10\log_{10}(2^{BPRE \cdot K_s}-1) \cdot \beta_{offset}^{PUSCH})$ for $K_s=1.25$, and $\Delta_{TF,b,f,c}(i)=0$ for $K_s=0$. Herein, $K_s$ is a value (e.g., deltaMCS) which is set for the activated uplink BWP b of the carrier f of the cell c through the higher signal. $\Delta_{TF,b,f,c}(i)=0$ if the PUSCH transmission is transmitted for a plurality of layers. $BPRE=\Sigma_{r=0}^{C-1} K_r/N_{RE}$ if the PUSCH transmission includes data information (UL-SCH), and $BPRE=Q_m \cdot R/\beta_{offset}^{PUSCH}$ if the PUSCH transmission includes the CSI but does not include the data information (UL-SCH). Herein, C is the number of code blocks, $K_r$ is the size of the code block r, and $N_{RE}$ is the number of REs and $N_{RE}=M_{RB,b,f,c}(i) \cdot \Sigma_{j=0}^{N_{symb,b,f,c}^{PUSCH}(i)-1} N_{sc,data}^{RB}(i, j)$. Herein, $N_{symb,b,f,c}^{PUCCH}(i)$ is the number of OFDM symbols at the PUSCH transmission occasion i and $N_{sc,data}^{RB}(i, j)$ is the number of subcarriers excluding the DM-RS and phase-tracking RS in the PUSCH transmission symbol j, $0 \leq j < NR_{sc,data}^{RB}(i, j)$. $\beta_{offset}^{PUSCH}=1$ if the PUSCH transmission includes the data information (UL-SCH), and

[Equation 7]

$$P_{PUSCH,b,f,c}(i, j, q_d, l) = \min\left\{\begin{array}{l} P_{CMAX,f,c}(i), \\ P_{O_{PUSCH},b,f,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l) \end{array}\right\} [dBm]$$

Herein, $P_{PUSCH,b,f,c}(i, j, q_d, l)$ denotes transmission power of the PUCCH transmitted through the PUCCH transmission occasion i using a transmission power parameter set configuration with index j and the transmission power control adjustment state with index I in the activated uplink BWP b of the carrier f of the cell c at the terminal. Each parameter in [Equation 7] is as follows.

- $P_{CMAX,f,c}(i)$ is the maximum output power configured at the PUCCH transmission occasion i of the carrier f of the cell c.
- $P_{O\_PUSCH,b,f,c}(j)$ is a parameter including $P_{O\_NOMINAL\_PUSCH,f,c}(j)+P_{O\_UE\_PUSCH,f,c}(j)$, and is a value notified by the base station to the terminal through the higher signal signaling.
- $M_{RB,b,f,c}^{PUSCH}(i)$ is the PUCCH transmission frequency resources scheduled or configured at the PUCCH transmission occasion i and may be expressed by the number of PRBs or the number of REs.
- $PL_{b,f,c}(q_d)$ is the downlink pathloss value measured by the terminal using the reference signal index $q_d$ transmitted in the activated downlink BWP, and the reference signal index may be configured through the higher signal (e.g., PUCCH-PathlossReferenceRS) from the base station. If the reference signal index is not set from the base station through the higher signal, the terminal may measure the path loss by using the reference signal of the synchronization signal block including the MIB. In this case, the terminal may determine one of the reference signal indices configured through the higher signal from the base station through one or more values $\beta_{offset}^{PUSCH}=\beta_{offset}^{CSI,1}$ if the PUSCH transmission includes the CSI but does not include the data information (UL-SCH). At this time, the value of $\beta_{offset}^{CSI,1}$ may include one or more values configured through a pre-defined table or a higher signal from the base station, and the terminal may be selected with the value $\beta_{offset}^{CSI,1}$ through the uplink scheduling information (UL grant), for example, a beta_offset indicator.

$Q_m$ and R are a modulation order and a target code rate respectively if the PUSCH transmission includes the CSI but does not include the data information (UL-SCH).

$f_{b,f,c}(i, l)$ is a transmission power control adjustment state parameter at the PUSCH transmission occasion i in the activated uplink BWP b of the carrier f of the cell c and is the parameter for performing the power control with the closed-loop. The base station may correct or control the PUSCH transmission power in the UE specific manner, in one of absolute-based and accumulation-based manners. The terminal may be configured with one of the absolute basis or the accumulation basis through a higher signal in the closed-loop transmission power control manner.

$f_{b,f,c}(i, l)=\delta_{PUSCH,b,f,c}(i, l)$ in the absolute-based closed-loop transmission power control manner, and the value $\delta_{PUSCH,b,f,c}$ is a value which may be predefined between the base station and the terminal through one or more values or tables, or set to the terminal through a higher signal. $\delta_{PUSCH}$ is a transmit power control (TPC) command value CCCC $f_{b,f,c}(i, l) = f_{b,f,c}(i-i_0, l) + \sum_{m=0}^{C(D_i)-1} \delta_{PUSCH,b,f,c}(m, l)$ in the accumulation-based closed-loop transmission power control manner. Herein, $\delta_{PUSCH}$ is the TPC command value. $\sum_{m=0}^{C(D_i)-1} \delta_{PUSCH,b,f,c}(m, l)$ is a sum of the value $\delta_{PUSCH,b,f,c}$ received by the terminal from a $K_{PUSCH}(i-i_0)-1$ symbol at a PUSCH transmission occasion $i-i_0$ before a $K_{PUSCH}(i)$ symbol at the PUSCH transmission occasion i. At this time, the value $\delta_{PUSCH,b,f,c}$ is one of values of a set $D_i$ including the TPC command values, and $C(D_i)$ is cardinality. Herein, $i_0$ is an integer value greater than 0, and is the smallest integer value of the $K_{PUSCH}(i-i_0)$ symbol before the PUSCH transmission occasion $i-i_0$ earlier than the $K_{PUSCH}(i)$ symbol before the PUSCH transmission occasion i. If the terminal transmits the PUSCH through the uplink scheduling information (UL grant), $K_{PUSCH}(i)$ is the number of symbols from the last symbol of the PDCCH receiving the scheduling information before the first symbol of the PUSCH transmission.

The first transmission power determining method as described above determines the PUSCH or PUCCH transmission resources based on the PUSCH or PUCCH transmission frequency and the time resources configured or indicated by the base station at the terminal, and thus determines the transmission power. However, the terminal performing the uplink transmission in the unlicensed band may determine the valid resources for the PUSCH or PUCCH transmission through at least one method or a combination of methods among various methods proposed in the present disclosure, and requires the second transmission power determining method for the determining the transmission power by using the determined valid resources.

Meanwhile, the transmission power control or the second transmission power determining method for the uplink control channel of the wireless communication system is given by the following [Equation 8].

[Equation 8]

$$P_{PUCCH}(i, q_u, q_d, l) = \min\left\{ \begin{array}{l} P_{CMAX,f,c}(i) \\ P_{0\_PUCCH,b,f,c}(q_u) + 10\log_{10}(2^\mu \cdot M_{RB,b,f,c}^{PUCCH}(i)) + PL_{b,f,c}(q_d) + \Delta_{F_{PUCCH}}(F) + \Delta_{TF,b,f,c}(i) + g_{b,f,c}(i, l) \end{array} \right\} [dBm]$$

Herein, $P_{PUCCH,b,f,c}(i, q_u, q_d, l)$ denotes the transmission power of the PUCCH transmitted through the PUCCH transmission occasion i using the transmission power control adjustment state with index l in the activated uplink BWP b of the carrier f of the cell c at the terminal. Each parameter in [Equation 8] is as follows.

$P_{CMAX,f,c}(i)$ is the maximum output power configured at the PUCCH transmission occasion i of the carrier f of the cell c.

$P_{0\_PUSCH,b,f,c}(q_u)$ is the parameter including $P_{0\_NOMINAL\_PUCCH,f,c} + P_{0\_UE\_PUCCH,f,c}(q_u)$, and is the value notified by the base station to the terminal through the higher signal signaling.

$M_{RB,b,f,c}^{PUCCH}(i)$ is the number of PRBs or the number of REs determined to be valid by various methods of the present disclosure among the PUCCH transmission frequency resources scheduled or configured at the PUCCH transmission occasion i.

$PL_{b,f,c}(q_d)$ is the downlink pathloss value measured by the terminal using the reference signal index $q_d$ transmitted in the activated downlink BWP, and the reference signal index may be configured through a higher signal (e.g., PUCCH-PathlossReferenceRS) from the base station.

$\Delta_{F_{PUCCH}}(F)$ is a value transmitted and configured to the terminal through a higher signal and a value varying according to the format of the transmitted PUCCH.

$\Delta_{TF,b,f,c}(i)$ is a PUCCH transmission power adjustment component value and is $\Delta_{TF,b,f,c}(i) = 10 \log_{10}(N_{ref}^{PUCCH}/N_{symb}^{PUCCH}(i)) + \Delta_{UCI}(i)$ for the PUCCH format 0 or 1. At this time, $N_{symb}^{PUCCH}(i)$ is the number of PUCCH transmission OFDM symbols. $N_{ref}^{PUCCH} = 2$ and $\Delta_{UCI}(i) = 0$ for the PUCCH format 0, and $N_{ref}^{PUCCH} = N_{symb}^{slot}$ and $\Delta_{UCI}(i) = 10 \log_{10}(O_{CSI}(i))$ for the PUCCH format 1.

If the number of UCI bits is equal to or smaller than 11 in the PUCCH format 2, 3 or 4, $\Delta_{TF,b,f,c}(i) = 10 \log_{10}(K_1 \cdot (n_{HARQ-ACK}(i) + O_{SR}(i) + O_{CSI}(i))/N_{RE}(i))$. At this time, $K_1=6$. $n_{HARQ-ACK}(i)$ is the number of HARQ-ACK bits. If the terminal does not receive the pdsch-HARQ-ACK-Codebook configuration information through the higher signal, $n_{HARQ-ACK}(i) = 1$ if the HARQ-ACK information is included in the PUCCH transmission, and $n_{HARQ-ACK}(i) = 0$ if the HARQ-ACK information is not included. $O_{SR}(i)$ and $O_{CSI}(i)$ are the number of the SR information bits and the CSI information bits transmitted at the PUCCH transmission occasion i respectively. $N_{RE}(i)$ is the number of the REs transmitting the PUCCH and $N_{RE}(i) = M_{RB,b,f,c}^{PUCCH}(i) \cdot N_{SC,ctrl}^{RB}(i) \cdot N_{symb-UCI,b,f,c}^{PUCCH}(i)$. $N_{SC,ctrl}^{RB}(i)$ is the number of other subcarriers than the subcarrier transmitting the DM-RS among the number of subcarriers included in one RB. At this time, $N_{SC,ctrl}^{RB}(i)$ may become the number of the subcarriers determined to be valid through various methods of the present disclosure in the number of other subcarriers than the subcarrier transmitting the DM-RS among the number of the subcarriers included in one RB. $N_{symb-UCI,b,f,c}^{PUCCH}(i)$ is the number of other symbols than the OFDM symbol transmitting the DM-RS in the number of the PUCCH symbols transmitted at the PUCCH transmission occasion i.

If the number of the UCI bits is greater than 11 in the PUCCH format 2, 3 or 4, $\Delta_{TF,b,f,c}(i) = 10 \log_{10}(2^{K_2 \cdot BPRE(i)} - 1)$. At this time, $K_2 = 2.4$, and $BPRE(i) = (O_{ACK}(i) + O_{SR}(i) + O_{CSI}(i) + O_{CRC}(i))/N_{RE}(i)$. If the terminal does not receive the pdsch-HARQ-ACK-Codebook configuration information through the higher signal, $O_{ACK}(i) = 1$ if the HARQ-ACK information is included in the PUCCH transmission, and $O_{ACK}(i) = 0$ if the HARQ-ACK information is not included. $O_{SR}(i)$, $O_{CSI}(i)$, and $O_{CRC}(i)$ are the numbers of the SR information, the CSI information, and the CRC bits transmitted at the PUCCH transmission occasion i.

$g_{b,f,c}(i, l)$ is the transmission power control adjustment state parameter of the PUSCH transmission occasion i in the activated uplink BWP b of the carrier f of the cell c and is the parameter for performing the power control with the closed-loop. The base station may correct or control the PUSCH transmission power in the UE specific manner, in the accumulation-based manner unlike the PUSCH, and detailed descriptions thereof will be omitted.

Meanwhile, the transmission power control or the second transmission power determining method for the uplink data channel of the wireless communication system is given by the following [Equation 9].

$$P_{PUSCH,b,f,c}(i, j, q_d, l) = \qquad\qquad\qquad\qquad\qquad\qquad\qquad\qquad\qquad\qquad\text{[Equation 9]}$$
$$\min\left\{ \begin{array}{l} P_{CMAX,f,c}(i), \\ P_{0_{PUSCH},b,f,c}(j) + 10\log_{10}(2^\mu \cdot M_{RB,b,f,c}^{PUSCH}(i) + \alpha_{b,f,c}(j) \cdot PL_{b,f,c}(q_d) + \Delta_{TF,b,f,c}(i) + f_{b,f,c}(i, l) \end{array} \right\}[dBm]$$

Herein, $P_{PUSCH,b,f,c}(i, j, q_d, l)$ denotes transmission power of the PUSCH transmitted through the PUCCH transmission occasion i using the transmission power parameter set configuration with index j and the transmission power control adjustment state with index I in the activated uplink BWP b of the carrier f of the cell c at the terminal. Each parameter in [Equation 9] is as follows.

$P_{CMAX,f,c}(i)$ is the maximum output power configured at the PUCCH transmission occasion i of the carrier f of the cell c.

$P_{O\_PUSCH,b,f,c}(j)$ is the parameter including $P_{0\_NOMINAL\_PUSCH,f,c}(j) + P_{0\_UE\_PUSCH,f,c}(j)$, and is the value notified by the base station to the terminal through the higher signal signaling.

$M_{RB,b,f,c}^{PUSCH}(i)$ is the number of the PRBs or the number of the REs determined to be valid by various methods of the present disclosure among the PUCCH transmission frequency resources scheduled or configured at the PUCCH transmission occasion i.

$PL_{b,f,c}(q_d)$ is the downlink pathloss value measured by the terminal using the reference signal index $q_d$ transmitted in the activated downlink BWP, and the reference signal index may be configured through a higher signal (e.g., PUSCH-PathlossReferenceRS) from the base station. If the reference signal index is not set from the base station through the higher signal, the terminal may measure the path loss by using the reference signal of the synchronization signal block including the MIB. In this case, the terminal may determine one of the reference signal indices configured through the higher signal from the base station through one or more values of the uplink scheduling information (UL grant). For example, the terminal may measure the path loss by using the reference signal mapped to the SRI field value of the uplink scheduling information.

$\alpha_{b,f,c}(j)$ is one of the values including the values between 0 and 1 and may be set through the higher signal from the base station with respect to the transmission power parameter set j.

$\Delta_{TF,b,f,c}(i)$ is $\Delta_{TF,b,f,c}(i) = 10 \log_{10}((2^{BPRE \cdot K_s} - 1) \cdot \beta_{offset}^{PUSCH})$ for $K_s = 1.25$, and $\Delta_{TF,b,f,c}(i) = 0$ for $K_s = 0$. Herein, $K_s$ is the value (e.g., deltaMCS) which is set for the activated uplink BWP b of the carrier f of the cell c through the higher signal. $\Delta_{TF,b,f,c}(i) = 0$ is the PUSCH transmission is transmitted for a plurality of layers. $BPRE = \Sigma_{r=0}^{C-1} K_r / N_{RE}$ if the PUSCH transmission includes data information (UL-SCH), and $BPRE = Q_m \cdot R / \beta_{offset}^{PUSCH}$ if the PUSCH transmission includes the CSI but does not include the data information (UL-SCH). Herein, C is the number of code blocks, $K_r$ is the size of the code block r, and $N_{RE}$ is the number of the REs and $N_{RE} = M_{RB,b,f,c}^{PUSCH}(i) \cdot \Sigma_{j=0}^{N_{symb,b,f,c}^{PUSCH}(i)-1} N_{sc,data}^{RB}(i, j)$. Herein, $N_{symb,b,f,c}^{PUSCH}(i)$ is the number of OFDM symbols at the transmission occasion i and $N_{sc,data}^{RB}(i, j)$ is the number of subcarriers excluding the DM-RS and the phase-tracking RS in the PUSCH transmission symbol j, $0 \leq j < N_{sc,data}^{RB}(i,j)$. At this time, $N_{sc,data}^{RB}(i, j)$ may be the number of the subcarriers determined to be valid for the PUSCH transmission in the number of the subcarriers excluding the DM-RS and the phase-tracking RS in the PUSCH transmission symbol j, $0 \leq j < N_{sc,data}^{RB}(i, j)$. $\beta_{offset}^{PUSCH} = 1$ if the PUSCH transmission includes the data information (UL-SCH), and $\beta_{offset}^{PUSCH} = \beta_{offset}^{CSI,1}$ if the PUSCH transmission includes the CSI but does not include the data information (UL-SCH). At this time, the value of $\beta_{offset}^{CSI,1}$ may include one or more values configured through a pre-defined table or a higher signal from the base station, and the terminal may be selected with the value $\beta_{offset}^{CSI,1}$ offset through the uplink scheduling information (UL grant), for example, the beta_offset indicator.

$Q_m$ and R are the modulation order and the target code rate respectively if the PUSCH transmission includes the CSI but does not include the data information (UL-SCH).

$f_{b,f,c}(i, l)$ is the transmission power control adjustment state parameter at the PUSCH transmission occasion i in the activated uplink BWP b of the carrier i of the cell c and is the parameter for performing the power control with the closed-loop. The base station may correct or control the PUSCH transmission power in the UE specific manner, in one of absolute-based and accumulation-based manners. The terminal may be configured with one of the absolute basis or the accumulation basis through the higher signal in the closed-loop transmission power control manner.

$f_{b,f,c}(i, l) = \delta_{PUSCH,b,f,c}(i, l)$ in the absolute-based closed-loop transmission power control manner, and the value $\delta_{PUSCH,b,f,c}$ is the value which may be predefined between the base station and the terminal through one or more values or the table or configured to the terminal through a higher signal. $\delta_{PUSCH}$ is the TPC command value $f_{b,f,c}(i, l) = f_{b,f,c}(i - i_0, l) + \Sigma_{m=0}^{C(D_i)-1} \delta_{PUSCH,b,f,c}(m, l)$ in the accumulation-based closed-loop transmission power control manner. Herein, $\delta_{PUSCH}$ is the TPC command value. $\Sigma_{m=0}^{C(D_i)-1} \delta_{PUSCH,b,f,c}(m, l)$ is the sum of the value $\delta_{PUSCH,b,f,c}$ received by the terminal from a $K_{PUSCH}(i-i_0)-1$ symbol at the PUSCH transmission occasion $i-i_0$ before the $K_{PUSCH}(i)$ symbol at the PUSCH transmission occasion i. At this time, the value $\delta_{PUSCH,b,f,c}$ is one of the values of the set $D_i$ including the TPC command values, and $C(D_i)$ is cardinality. Herein, $i_0$ is an integer value greater than 0, and is the smallest integer value of the $K_{PUSCH}(i-i_0)$ symbol before the PUSCH transmission occasion $i-i_0$ earlier than the $K_{PUSCH}(i)$ symbol before the PUSCH transmission occasion i. If the terminal transmits the PUSCH through the uplink scheduling information (UL grant), $K_{PUSCH}(i)$ is the number of the symbols from the last symbol of the PDCCH receiving the scheduling information before the first symbol of the PDCCH transmission.

The terminal may determine the method for determining the uplink signal transmission power, that is, whether to determine the uplink signal transmission power according to the first transmission power determining method or whether to determine the uplink signal transmission power according to the second transmission power determining method according to the processing time of the terminal as shown in [Equation 4].

According to an embodiment, if the transmission of the uplink signal is started after the time (e.g., $T_{proc,2}$ or $L_2$) required for the terminal to receive the channel access procedure result or the LBT result information of the base station and correctly acquire the channel access procedure result or the LBT result information of the base station by processing it, the terminal may determine the uplink signal transmission power according to the second transmission power determining method. If the transmission of the uplink signal is started before the time (e.g., $T_{proc,2}$ or $L_2$) required for the terminal to receive the channel access procedure result or the LBT result information of the base station and correctly acquire the channel access procedure result or the LBT result information of the base station by processing it, the terminal may determine the uplink signal transmission power according to the first transmission power determining method.

According to another embodiment, for the terminal to determine the uplink signal transmission power according to the second transmission power determining method after the time (e.g., $T_{proc,2}$ or $L_2$) required for the terminal to receive the channel access procedure result or the LBT result information of the base station and correctly acquire the channel access procedure result or the LBT result information of the base station by processing it, the terminal may need a time to determine valid uplink signal transmission resources and accordingly change or recalculate the transmission power. Hence, if the transmission of the uplink signal is started after the time (e.g., $T_{proc,2}$ or $L_2$) required for the terminal to receive the channel access procedure result or the LBT result information of the base station and correctly acquire the channel access procedure result or the LBT result information of the base station by processing it, or the time (e.g., $T_{proc,3}$ or $L_3$) to determine the valid uplink signal transmission resources according to the LBT result information of the base station and accordingly change or recalculate the transmission power, the terminal may determine the uplink signal transmission power according to the second transmission power determining method. If the transmission of the uplink signal is started before the time (e.g., $T_{proc,2}$ or $L_2$) required for the terminal to receive the channel access procedure result or the LBT result information of the base station and correctly acquire the channel access procedure result or the LBT result information of the base station by processing it, or the time (e.g., $T_{proc,3}$ or $L_3$) required to determine the valid uplink signal transmission resources according to the LBT result information of the base station and accordingly change or recalculate the transmission power, the terminal may determine the uplink signal transmission power according to the first transmission power determining method. In so doing, since determining at the terminal the uplink signal transmission resources and accordingly determining the transmission power needs the time $T_{proc,3}$ or $L_3$ required for the terminal to receive the uplink scheduling information and transmit the uplink signal, $T_{proc,3}$ or $L_3$ may be the same value as $T_{proc,2}$ or $L_2$. In this case, $T_{proc,3}$ or $L_3$ may be newly defined.

Figure 15:
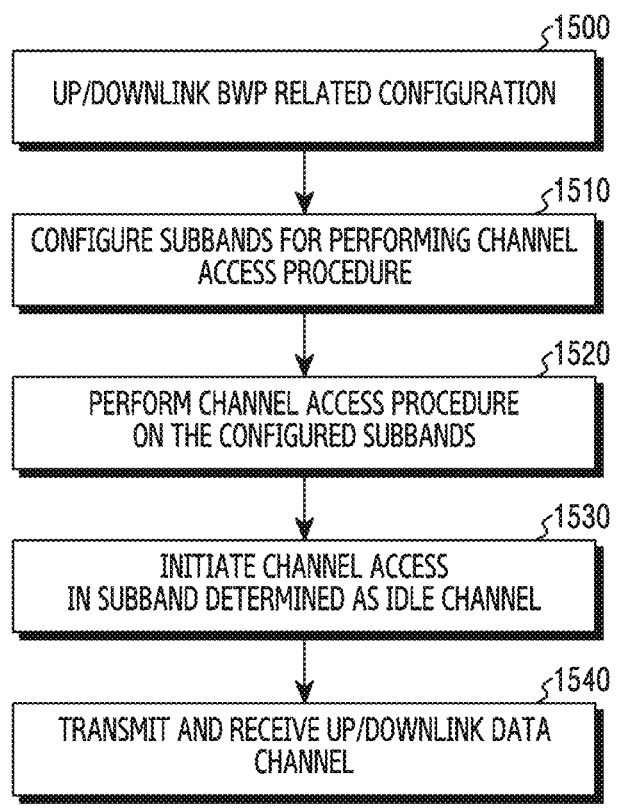
FIG. 15 illustrates an example of operations of a base station in a wireless communication system according to various embodiments of the present disclosure.

FIG. 15 illustrates an example of operations of a base station in a wireless communication system according to various embodiments of the present disclosure.

Although not depicted in FIG. 15, the base station may receive at least one or more capability information of the uplink channel access procedure type supported by the terminal, the uplink signal transmission start position in the symbol, the uplink signal transmission end position in the symbol, whether to support the function for transmitting one or more different transmission blocks through one or more uplink data channel transmissions through one DCI, and whether to transmit the code block-based transmission from the terminal through a capability information report.

In step 1500, the base station performs up/downlink BWP related configuration. Specifically, the base station may transmit configuration information of the carrier or the cell and its corresponding frequency band for communicating with the terminal, and configuration information of the BWP for communicating with the terminal within the above-described frequency or cell bandwidth to the terminal through a higher signal. If the above-described carrier or cell is the unlicensed band carrier or cell, the base station may divide the bandwidth or the BWP of the above-described base station or cell into one or more subbands, and transmit subband configuration information to the terminal through a higher signal.

In step 1510, the base station performs the subband configuration for conducting the channel access procedure. Specifically, the base station may perform the channel access procedure. In this case, the channel access procedure may be performed based on the carrier or the entire cell bandwidth, or may be performed based on the BWP or one or more subbands.

In step 1520, the base station performs the channel access procedure on the configured subbands. Specifically, the base station may occupy a channel through the carrier, the cell, the BWP, or the subband determined to be idle through the channel access procedure.

In step 1530, the base station initiates the channel access procedure in the subband determined as the idle channel. Specifically, the base station may transmit the channel access procedure result to the terminal. In this case, the channel access procedure result may be transmitted to the terminal over the downlink control channel, and may be transmitted over the downlink control channel transmitted to the entire cell terminals or to a specific terminal group. In addition, the base station may transmit a downlink control channel for scheduling downlink data channel reception and its downlink data channel, a downlink control channel for scheduling uplink data channel transmission, a downlink control channel for requesting CSI information report, and a downlink control channel for requesting uplink control signal transmission to the terminal.

In so doing, although not depicted, the base station may transmit time (channel occupancy time) and/or slot format information for occupying and using the above-described unlicensed band to the terminal.

In step 1540, the base station performs up/downlink data channel transmission and reception. Specifically, the base station may communicate with the terminal for the channel occupation time.

Each of the above-described steps may not be necessarily performed in sequence, and a specific step may be omitted or the described sequence may be changed.

Figure 16:
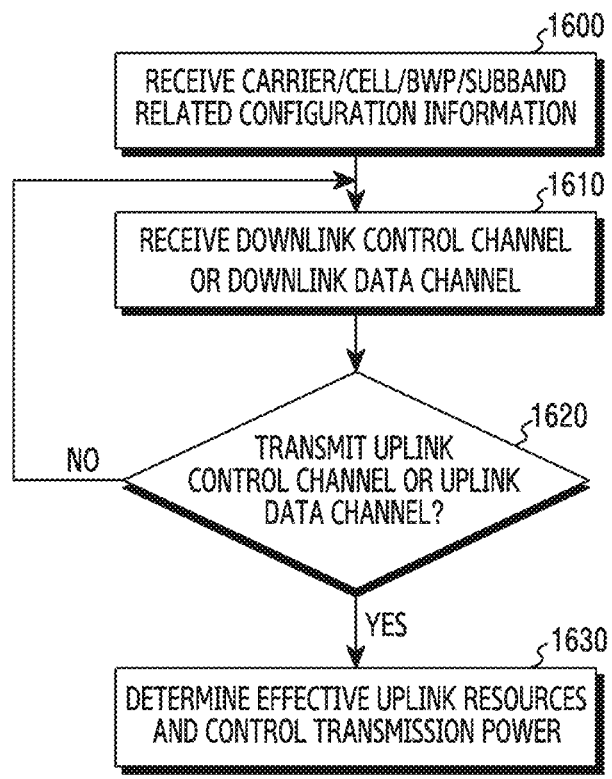
FIG. 16 illustrates an example of operations of a terminal in a wireless communication system according to various embodiments of the present disclosure.

FIG. 16 illustrates an example of operations of a terminal in a wireless communication system according to various embodiments of the present disclosure.

In step 1600, the terminal receives carrier/cell/BWP/subband related configuration information. Specifically, the terminal may be configured with the configuration information of the carrier or cell for communicating with the base station and its corresponding frequency band, and the configuration information of the BWP for communicating with the terminal within the above-described frequency or cell bandwidth from the base station through a higher signal. If the above-described carrier or cell is the unlicensed band carrier or cell, and the base station divides the bandwidth or the BWP of the above-described base station or cell into one or more subbands, the terminal may be configured with the above-described subband configuration information from the base station through the higher signal.

In step 1610, the terminal receives a downlink control channel or a downlink data channel. Specifically, the terminal may receive through the downlink control channel the channel access procedure result of the base station and/or the time (channel occupancy time) and/or the slot format information used by the base station by occupying the above-described unlicensed band. In this case, the channel access procedure result of the base station may include one or more carriers, cells, BWPs, or subbands. In addition, in step 1610, the terminal may receive a downlink control channel for scheduling the downlink data channel reception and its downlink data channel, a downlink control channel for scheduling uplink data channel transmission, a downlink control channel for requesting CSI information report, and a downlink control channel for requesting uplink control signal transmission.

In step 1620, the terminal determines whether to transmit the uplink control channel (PUCCH) or the uplink data channel (PUSCH) at a specific transmission timing.

If the terminal determines in step 1620 to transmit through the PUCCH or the PUSCH at the specific transmission timing, the terminal may determine valid uplink resources for the PUCCH or PUSCH transmission according to various embodiments of the present disclosure and determine and control the transmission power for the uplink signal in step 1630. In so doing, the terminal may differently apply the uplink transmission power determining method depending on the processing time required to receive and correctly acquire the LBT result information transmitted by the base station, the processing time required for the terminal to determine the valid resources for the uplink signal transmission, the processing time for the terminal to determine the transmission power according to the determined valid resources, and the like.

Each step described above may not be necessarily performed in sequence, and a specific step may be omitted or the described sequence may be changed.

In the present disclosure, to determine whether a specific condition (or criterion) is fulfilled, expressions of greater than or less than are used but they are by way of example and do not exclude expressions of greater than or equal to or less than or equal to. A condition described with 'greater than or equal to' may be replaced by 'greater than', a condition described with 'less than or equal to' may be replaced by 'less than', and a condition described with 'greater than or equal to and less than' may be replaced by 'greater than and less than or equal to'.

The methods according to the embodiments described in the claims or the specification of the present disclosure may be implemented in software, hardware, or a combination of hardware and software.

For the software implementation, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of them. In addition, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which carries out an embodiment of the present disclosure.

In the specific embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, and the elements expressed in the plural form may be configured as a single element, or the elements expressed in the singular form may be configured as a plurality of elements.

Meanwhile, the embodiments of the present disclosure disclosed in the present specification and the drawings merely provide specific examples to easily describe the technical content of the present disclosure and to help understanding of the present disclosure, and are not intended to limit the scope of the present disclosure. That is, it may be apparent that various changes may be made based on the technical idea of the present disclosure to those skilled in the technical field to which the present disclosure belongs. In addition, the above-described embodiments each may be combined and operated as necessary. For example, some of the methods proposed in the present disclosure may be combined together to operate the base station and the terminal. Also, the above-described embodiments have been presented based on the 5G and NR systems, but other systems such as LTE, LTE-A, and LTE-A-Pro systems may also make other modifications based on the technical idea of the above-described embodiment.

INDUSTRIAL APPLICABILITY

The present disclosure generally relates to a wireless communication system, and more particularly, a method and an apparatus for determining resources for a terminal to transmit an uplink signal or channel and controlling its power in the wireless communication system. Various embodiments of the present disclosure may provide a method and an apparatus for determining resources for transmitting an uplink signal or channel and controlling power therefor in a wireless communication system.

The invention claimed is:

1. A method performed by a user equipment (UE) in a wireless communication system, the method comprising:

receiving, from a base station, downlink control channel including scheduling information for uplink signal transmission, and a result of a channel access procedure of the base station;

based on at least one of the scheduling information and the result of the channel access procedure, identifying a valid resource for a transmission of an uplink signal; and transmitting, to the base station, the uplink signal based on the valid resource, wherein the result of the channel access procedure includes information on a channel occupation time for an unlicensed band, and wherein the uplink signal is transmitted during the channel occupation time.

2. The method of claim 1,
wherein the downlink control channel includes a listen before talk (LBT) result of the base station, and
wherein the LBT result indicates the result of the channel access procedure.

3. The method of claim 1,
wherein the valid resource includes a subband determined to be idle based on the result of channel access procedure.

4. The method of claim 1,
wherein the valid resource includes a frequency resource not included in a guard band based on the scheduling information.

5. The method of claim 1,
wherein the valid resource is determined based on a guard band, and
wherein the guard band is determined based on a subband occupied by the base station.

6. The method of claim 1,
wherein the valid resource includes a frequency resource on which the channel access procedure is performed among scheduled frequency resources.

7. The method of claim 1,
wherein the channel occupation time indicates an occupation time per subband for the unlicensed band.

8. A method performed by a base station in a wireless communication system, the method comprising:
configuring a subband for a channel access procedure;
performing the channel access procedure for the configured subband;
transmitting, to a user equipment (UE), downlink control channel including scheduling information for uplink signal transmission, and a result of the channel access procedure of the base station; and
receiving, from the UE, uplink signal based on a valid resource, wherein the valid resource is identified based on at least one of the scheduling information and the result of channel access procedure,
wherein the result of the channel access procedure includes information on a channel occupation time for an unlicensed band, and
wherein the uplink signal is received during the channel occupation time.

9. The method of claim 8,
wherein the downlink control channel includes a listen before talk (LBT) result of the base station, and
wherein the LBT result indicates the result of the channel access procedure.

10. The method of claim 8,
wherein the valid resource includes a subband determined to be idle based on the result of channel access procedure.

11. The method of claim 8,
wherein the valid resource includes a frequency resource not included in a guard band based on the scheduling information.

12. The method of claim 8,
wherein the valid resource is determined based on a guard band, and
wherein the guard band is determined based on a subband occupied by the base station.

13. The method of claim 8,
wherein the valid resource includes a frequency resource on which the channel access procedure is performed among scheduled frequency resources.

14. The method of claim 8,
wherein the channel occupation time indicates an occupation time per subband for the unlicensed band.

15. A user equipment (UE) in a wireless communication system, the UE comprising:
a transceiver; and
at least one processor,
wherein the at least one processor is configured to:
receive, from a base station, downlink control channel including scheduling information for uplink signal transmission, and a result of a channel access procedure of the base station;
based on at least one of the scheduling information and the result of the channel access procedure, identify a valid resource for a transmission of an uplink signal; and
transmit, to the base station, the uplink signal based on the valid resource,
wherein the result of the channel access procedure includes information on a channel occupation time for an unlicensed band, and
wherein the uplink signal is transmitted during the channel occupation time.

16. The UE of claim 15,
wherein the downlink control channel includes a listen before talk (LBT) result of the base station, and
wherein the LBT result indicates the result of the channel access procedure.

17. The UE of claim 15,
wherein the valid resource includes a subband determined to be idle based on the result of channel access procedure.

18. The UE of claim 15,
wherein the valid resource includes a frequency resource not included in a guard band based on the scheduling information.

19. The UE of claim 15,
wherein the valid resource is determined based on a guard band, and
wherein the guard band is determined based on a subband occupied by the base station.

20. The UE of claim 15,
wherein the valid resource includes a frequency resource on which the channel access procedure is performed among scheduled frequency resources, and
wherein the channel occupation time indicates an occupation time per subband for the unlicensed band.

* * * * *